(12) United States Patent
Daneshvar

(10) Patent No.: US 9,688,206 B1
(45) Date of Patent: Jun. 27, 2017

(54) DANESHVAR CARRIER MEANS AND METHODS II

(71) Applicant: Yousef Daneshvar, West Bloomfield, MI (US)

(72) Inventor: Yousef Daneshvar, West Bloomfield, MI (US)

( * ) Notice: Subject to any disclaimer, the term of this patent is extended or adjusted under 35 U.S.C. 154(b) by 137 days.

(21) Appl. No.: 14/330,123

(22) Filed: Jul. 14, 2014

Related U.S. Application Data

(63) Continuation of application No. 11/092,311, filed on Mar. 29, 2005, now Pat. No. 8,777,542.

(60) Provisional application No. 60/556,787, filed on Mar. 29, 2004.

(51) Int. Cl.
    *B60R 5/04*      (2006.01)

(52) U.S. Cl.
    CPC .................................. *B60R 5/04* (2013.01)

(58) Field of Classification Search
    CPC ............................. B60R 5/04; B60R 5/041
    See application file for complete search history.

(56) References Cited

U.S. PATENT DOCUMENTS

| | | | | |
|---|---|---|---|---|
| 2,611,466 A * | 9/1952 | Biggert | ..................... | B60P 1/43 |
| | | | | 182/129 |
| 3,458,073 A * | 7/1969 | Dawson | ..................... | B60R 9/06 |
| | | | | 224/924 |
| 3,517,791 A * | 6/1970 | Miles | ........................ | B60P 1/43 |
| | | | | 14/69.5 |
| 3,844,424 A * | 10/1974 | Ross, Jr. | ................ | B61D 19/00 |
| | | | | 292/36 |
| 4,884,838 A * | 12/1989 | Slater | ................... | B62D 35/007 |
| | | | | 14/71.1 |
| 5,011,361 A * | 4/1991 | Peterson | ................... | B60R 9/06 |
| | | | | 224/497 |
| 5,033,662 A * | 7/1991 | Godin | ..................... | B60R 9/065 |
| | | | | 224/506 |

(Continued)

*Primary Examiner* — Brian D Nash

(57) ABSTRACT

The advanced life has brought the use of strollers, wheelchairs and carriers for easing the life and human care. However, handling these objects in and out of a vehicle has turned to be a practical problem. Commonly these units are lifted for placement in the trunk or inside a vehicle, however, manipulation of these units which have a noticeable weight and a rough shape are difficult and labor intensive. Particularly, by some mothers that does not have enough reserve doing other chores. This activity will increase the pain of those who just had C-sections or it can cause a new back and joint pains or worsen the existing ones. This application introduces methods and means to allow such a process to be done easily. This application introduces new units and methods which allows strollers and carriers and similar units to be placed inside a box means which is attached to the rear of a vehicle by use of a door that opens and stands on the ground to function as a ramp. This allows a wheeled unit to be wheeled up into the box and be kept inside the box means by means that are designed to prevent it from moving. The ramp will close as a door and locked. Thus this method will simplify the process of moving these objects and will practically eliminate the need for bending and lifting of such units. The box means will also function as a protector from rain, snow and bad environment.

18 Claims, 21 Drawing Sheets

(56) References Cited

U.S. PATENT DOCUMENTS

| | | | | |
|---|---|---|---|---|
| 5,199,842 A * | 4/1993 | Watt | A61G 3/0209 | 224/497 |
| 5,431,524 A * | 7/1995 | Antal | A61G 3/0209 | 296/61 |
| 5,540,474 A * | 7/1996 | Holland | B60P 1/435 | 296/61 |
| 5,658,032 A * | 8/1997 | Gardner | B60P 3/34 | 296/175 |
| 5,826,768 A * | 10/1998 | Gamulo | B60R 9/06 | 224/484 |
| 5,938,397 A * | 8/1999 | Schouest | B65G 69/30 | 14/69.5 |
| 5,967,736 A * | 10/1999 | Poindexter | B60R 5/04 | 414/549 |
| 6,216,867 B1 * | 4/2001 | Haseltine | B65D 85/68 | 206/335 |
| 6,379,101 B1 * | 4/2002 | Breaux | B60P 1/43 | 224/521 |
| 6,948,724 B2 * | 9/2005 | Davis | B25H 1/04 | 280/30 |
| 7,179,042 B1 * | 2/2007 | Hartmann | B65G 69/30 | 14/69.5 |
| 7,575,402 B2 * | 8/2009 | Boydstun, IV | B60P 3/08 | 410/24 |
| 8,777,542 B2 * | 7/2014 | Daneshvar | A61G 3/0209 | 224/527 |
| 8,822,885 B2 * | 9/2014 | Daneshvar | A47B 9/14 | 108/115 |
| 2002/0088065 A1 * | 7/2002 | Schmaltz | B60P 1/43 | 14/69.5 |
| 2003/0190207 A1 * | 10/2003 | Junge | B65D 19/44 | 410/3 |
| 2004/0262946 A1 * | 12/2004 | Rasmussen | A47C 17/84 | 296/156 |
| 2005/0214091 A1 * | 9/2005 | Daneshvar | A61G 3/0209 | 410/13 |
| 2010/0259060 A1 * | 10/2010 | Friesen | B60R 11/06 | 296/39.2 |
| 2010/0266378 A1 * | 10/2010 | Verwys | B60P 1/433 | 414/537 |
| 2011/0023245 A1 * | 2/2011 | Just | A61G 3/061 | 14/70 |

* cited by examiner

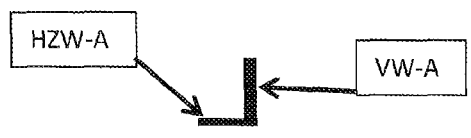
Figure. 14
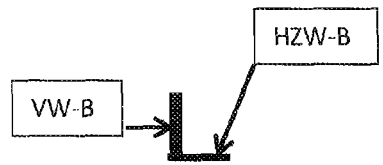
Figure. 15
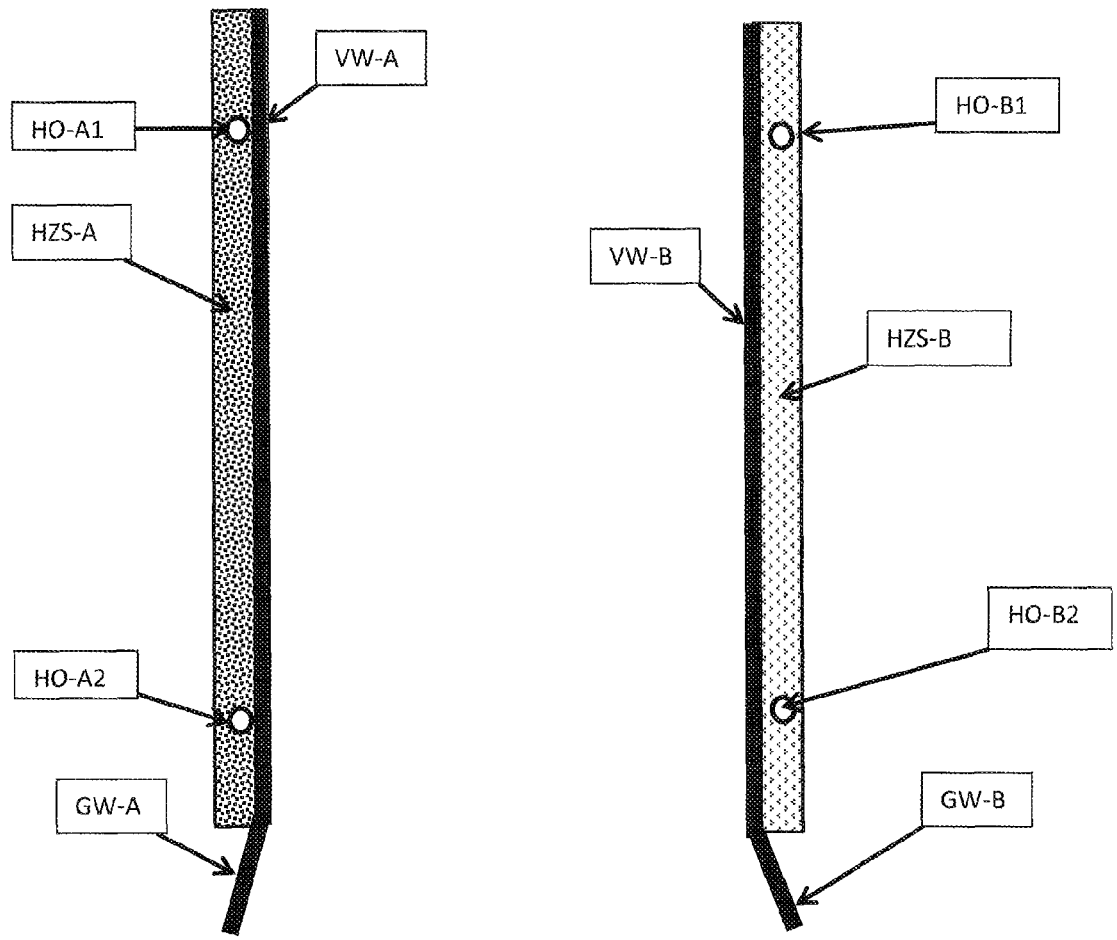
Figure. 16
Figure. 17

DANESHVAR CARRIER MEANS AND METHODS II

This is an none-provisional application requesting the priority of the pending application Ser. No. 11/092,311 with filing date: Mar. 29, 2005. Now, U.S. Pat. No. 8,777,542 issue date: Jul. 14, 2015 which claims priority of the provisional application No. 60/556,787 filing date Mar. 29, 2004.

Before starting this application the applicant wishes to inform the readers that for some reason he was faced with formatting problem in this application which did not give the option of removing some extra parts or spaces which obviously are inappropriate. Simply the computer program dysfunction overpowered the applicant's inability to correct these and he regrets.

THE BACKGROUND OF THIS INVENTION

The advanced life has brought the advantage of using various carrier means such as strollers, wheelchairs, scooters and similar for easing the human life. Commonly these units are lifted and placed inside the vehicle or its trunk. However, lifting of such heavy units with irregular shapes for placing them inside the vehicle or its trunk is difficult and labor intensive, particularly when the user has limited physical reserve and power. For this reason this applicant has introduced units to USPTO which helps in this regard by using a box means with a ramp for moving the carriers up and into the box means. Now he introduces improvements and additions to his previous invention for making the use of such units even easier. The inventions consider the difficulty in directing and advancing the incoming unit such as a stroller into the carrier box means. Since the incoming units being pushed up in a ramp will have the tendency for moving from side to side, and making it difficult for the user to manipulate the unit; stroller. Therefor the applicant is introducing adjustable short walls fixed on the ramp's surface for making groves for the wheels of the incoming unit; stroller to be directed inside these groves and move forward with ease. Also the applicant introduces sinusoidal ramp and spring walls as well as more means for allowing the units inside the carrier box to be more secure and prevent them from extra movements.

THE BRIEF EXPLANATION OF THE INVENTION

This new models are to allow wheeled units such as strollers, wheelchairs, scooters, carriers and similar, to be pushed easily inside a box means in the rear of an auto. This box means is attached to the rear of a vehicle and it's door opens and can be placed on the ground to function as a ramp. This ramp has a series of adjustable short walls placed on its upper surface making groves or a canal type passes, so that the wheels of the incoming unit; stroller can be moved into these groves and to be moved forward with ease. Also similarly he introduces a sinusoidal ramp so that it can function better for directing the incoming units. The applicant also introduces spring walls as well for allowing the walls to be pulled down and keep the units inside securely. The box means has pad means and other restraint means designed for preventing the unit inside the box from moving. The ramp means then will close as a door and be locked. Thus this method will simplify this process and will practically eliminate the need for bending and lifting of these objects. The box means will also function as a protector from rain, snow and bad environment.

The new models also use the previous ideas explained in previous application whenever it suits. This application also suggests different ways of adjustment of the box to the car by use of the body of the cars or the trunk in any possible way, so that the process of attachment of the box means to the car to be simpler and easier as possible. Naturally, modifications of the new cars could make such an attachment, easier and simpler.

The Figures:

Please notice that some parts of this invention are shown in different figures. This is to prevent a crowded figure. Importantly, please also note that many of the options are designed to be used in one model if applicable. Please also note FIGS. 1 to 13 shows the previous model and the year FIGS. 14 to 24 are related to new materials introduced.

BRIEF EXPLANATION OF THE FIGURES

FIGS. 14 and 15 show the side views of two L shaped pieces designed for being fixed on the surface of the ramp means shown at FIG. 18.

FIGS. 16 and 17 shows the top view of the L shaped pieces shown in previous FIGS. 14 and 15.

THE DETAILED EXPLANATIONS OF THE FIGURES

Figure 1:
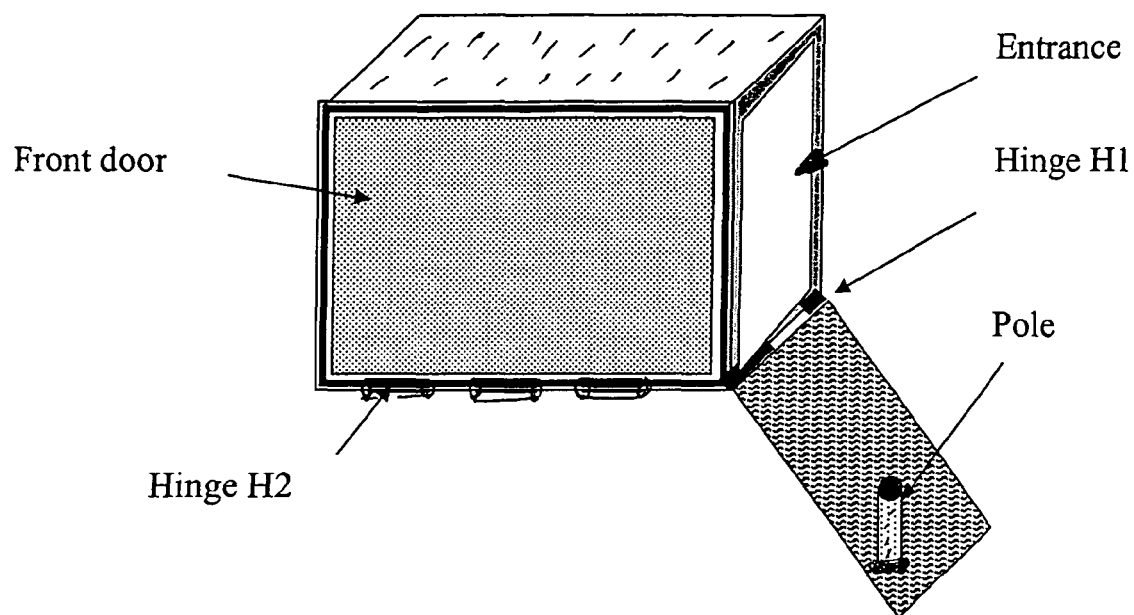
FIG. 1. Shows the body of the carrier means which consists of a box means with six walls.

FIG. 1. Shows the general figure of the carrier means. This carrier means contains a box means which has a rather rectangular, cubic shape with six walls as follows.

A. A lower wall that is the base of this box means. It has a rather flat shape and stands in a horizontal condition in order to allow the object to stand on it. This base has an attachment means, ATM best shown at FIG. 2 which is like a pole and connects the lower wall or the base piece to the body or the wall of a vehicle, commonly in the rear of the vehicle.

Figure 2:
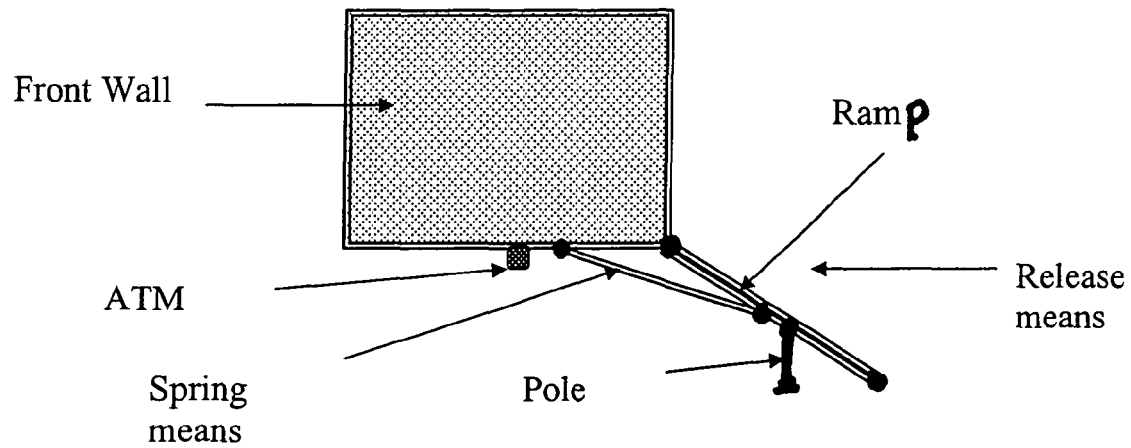
FIG. 2. Shows the front view of the carrier means, which the right wall is in an open position functioning as a ramp.

B. The right side wall of this carrier means is a wall which is attached to the base or the side of the carrier means by a hinge and can be opened to be placed on the ground. This wall plays a vital role in function of this carrier means by acting as a door, which opens along a hinge, Hinge H1, and moves to stand on the ground as a ramp, Ramp. This wall has a pole, Pole on its outer surface that functions as a handle that allows the door to be pulled and also it stands on the ground for holding the free end of the ramp above the ground for preventing it from being soiled. A spring means, Spring Means shown at FIG. 2 is attached to both the ramp, Ramp and the base or the body of the carrier means in a special position so that
it will hold the door=ramp in a closed position when the door is closed. Also it will keep the door open when it is opened and placed on the ground to function as the ramp. Please note that the pole, Pole stands between the lower surface of the ramp and the ground. Importantly, the size and shape of this pole may vary since some units may need significant support to be able to tolerate the heavy units such as scooters.

The front wall of this unit which is a vertical wall, also has an important function since it is hinged at Hinge H2 to the lower wall or the base of the unit and opens to allow accessing the inside of the box means. Also it may function as a ramp. This wall allows the box means to be accessed for adjusting the objects placed inside it. In this figure this door is shown in closed position.

D. The left wall of this unit functions as a wall. It may have pads or cushions for proper placement and protection of the object.

The top wall of this box shaped unit, functions as a wall, although it may have a hinge to allow it to open for accessing the box. It may also have pads or cushions for proper placement and protection of the objects.

The rear wall of this unit is a vertical wall and functions as a wall means and will make the rear of the box means. In some models this wall means may have means for allowing it to be attached to the vehicle. It may also have pads or cushions for proper placement and protection of the object.

Importantly, the body of this box means may be modified to make it more convenient and useable for various uses. It may be made to have a shape such as a suit case except with a third wall in the side to function as the ramp. Thus the walls may blend one on another, so that one wall piece to function as two or more walls, such as the base and the rear wall, or the base, the back wall and the left side wall etc. In the case of the suitcase shape, the upper and the side walls would be made up from combinations of two walls and the base will be a complete wall of itself or two walls one inside the other etc.

Or the box means may have different materials in different parts of the walls. Importantly, in certain models the design of the carrier means may be modified very differently for example the unit may have the base and the ramp and may have the screen means or net means for holding the object in place. Even in some of such models the ramp may be eliminated. Also importantly the box means may have inner shelves or compartments in order to allow the user to place other objects to be carried such as placing groceries or hand bags inside that compartment if desired. These shelves may be optional and they may be placed or removed, on a desirable basis.

FIG. 2. Shows the front view of the carrier when the observer is looking straight forward to the box from the rear of the vehicle. This view shows the carrier means when the right side wall in an open position functioning as a ramp, Ramp. The pole, Pole is rotated to the vertical position in order to stand on the ground and prevents the free end of the door from touching the ground and being soiled. Also the pole plays as a stabilizing means and hold the ramp in a straight position and prevents it from being bent down when the object is moved on it. A spring means, Spring Means is attached to the base and the ramp in a point that will hold the door in closed position and also will keep it in open position when the door is opened. The lower wall=base of this the carrier means has an attachment pole which its cross cut is shown at ATM. This pole means the base of this carrier means to the connection means of the vehicle, which is commonly located in the rear of the vehicle. Other forms of attachment means may be used for the purpose of attaching or connecting the carrier means to the vehicle. The attachment means may also be attached to the rear wall of the carrier means as well. Also different means may be used in order to allow the carrier means to be connected securely to various vehicles.

Figure 3:
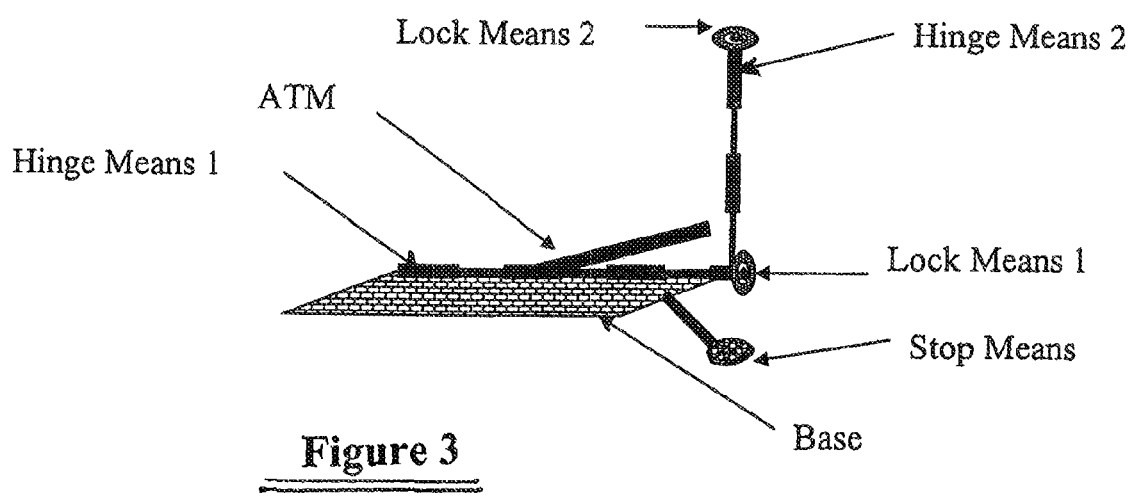
FIG. 3. Shows a system of the attachment for the carrier, this system allows the carrier to be attached to the vehicle, then to be tilted and rotated.

FIG. 3. Shows schematically a system of attachment means which allows the box means=the carrier means to be connected to the vehicle, and to be tilted and rotated when needed. This system has.

A base means, Base that allows the bottom/lower surface of the box means shown at FIG. 1-2 to be placed and attached to it. A horizontal hinge means, It has an attachment means, ATM which is like a pole and is designed to engaged and be connected to the body of the vehicle by a commonly used methods such as the connection means for pulling the boats.

c. A horizontal hinge means, Hinge Means 1 with a lock means, Lock Means 1. This hinge means allows the base which will have the box means on it, to be tilted on a horizontal axis. So that the rear part of the vehicle can be accessed. The lock means will keep this hinge means in a locked position. The lock means will be made from various known means so that when the lock means gets engaged the hinge means will stay in a locked condition and will not move.

d. A vertical hinge means, Hinge Means 2 with a lock means, Lock Means 2. This hinge means allows the base which will have the box means on it, to be rotated on a vertical axis. So that it will open similar to a door, to allow the rear part of the vehicle to be accessed. The lock means will keep this hinge means in a locked position. Also importantly, the lock means, Lock Means 1 and Lock Means 2 are designed to lock these hinges so that only one of hinges will be functional at a time. Also to lock both of them when desired such as during the period which the vehicle is moving.

e. Also the system has a stop means, Stop Means, which is designed to be used from moving the box means to an unwanted position such as tilting more than 90 degree or a predesigned level. In this model the stop means will come to stop at the body of the vehicle and prevent further movement of the box. Many other models of such a stop means may be used.

The base, Base has the attachment means, ATM which is like a pole and connects to the rear of a vehicle, to a commonly used attachment means in the rear of the vehicle, commonly used for pulling the trailers etc. Importantly, the attachment pole may consist of two or more parts to allow one piece to be attached to the vehicle on permanent basis and the second part to be attached to the carrier and these two pieces to be attached to each other on a detachable re-attachable basis.

Figure 4:
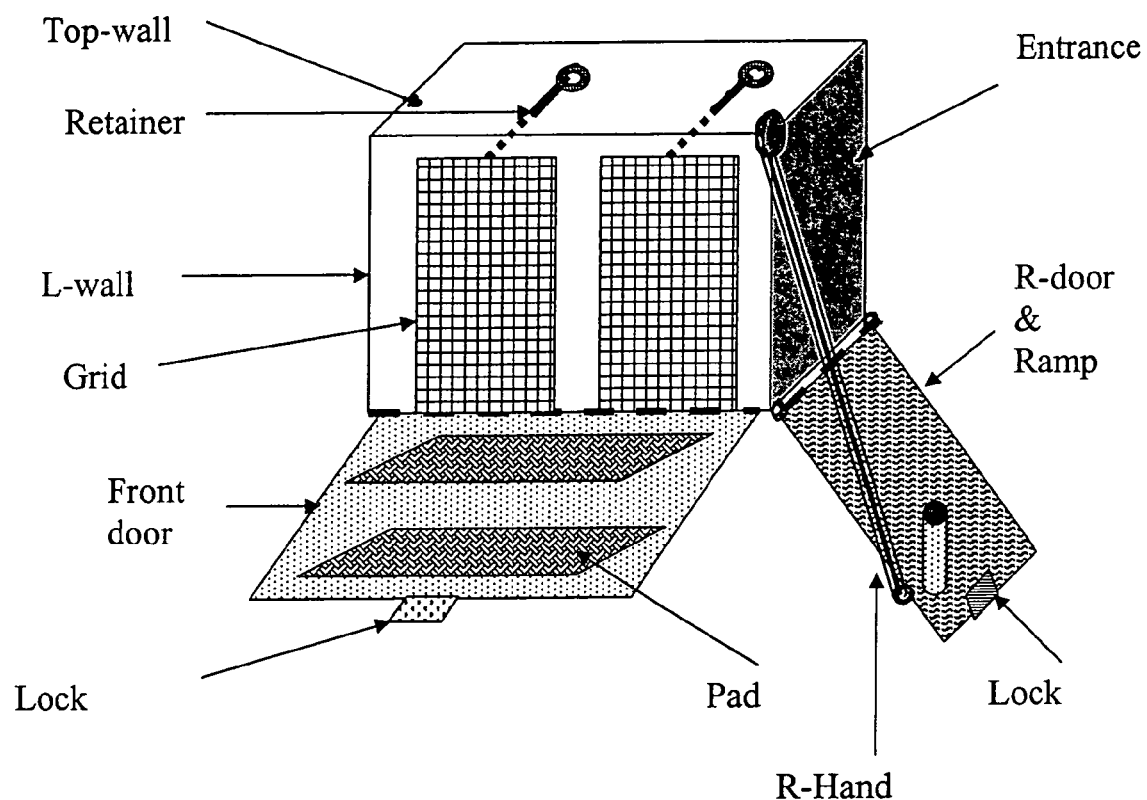
FIG. 4. Shows another view of the carrier means, in order to specify some of the important parts.

FIG. 4. Shows another view of the carrier means in order to specify some of the important parts. This figure shows the front door, Front Door in open position indicating that it can function as a ramp. This door has a lock means, Lock, which allows the door to be kept in a close position.

Also this figure shows a grid means, Grid that consists of two pieces one in the right and the other one in the left, designed to be pulled and hold the object inside the carrier means in a stable position. These grid means have retainers, Retainer that allows the grid means to be pulled and hold in a fixed position. The grid may be made from a flexible material such as a net or any other materials, such as fabrics depending the case. The function of the grid is to be pulled toward the rear wall in order to hold the object inside the box in a tight and secure position and prevent it from free movements. Initially the grid means will be posed away from the object to allow an open space for the placement of the object, however after the placement of the object the grid means will be pulled toward the rear wall of the carrier means by use of the retainer, Retainer in order to keep the object tightly. The function of the grid means is important since it prevents the damages to the object, otherwise the object will be loose inside the box while the vehicle is moving. The grid may be removed if desired. Importantly, the shape, size and various important specifics of this piece will be changed to match the need.

Also importantly, this figure shows a series of the pads means, PAD located on the inside surface of the front door. These pad means are designed to match the shape and make-up of the objects so that the closure of the door will press the pad means against the object and prevent from the movement of the object and damages. These pads may be made.

1. To be preshaped, such as shaped foams.
2. To be positioned in different places or chosen differently, such as having an attachment means such as hook and loop fastener so that their position, sizes or their selections to be changed easily.
3. They may be made from inflatable balloons or pads. So that initially the unit is flat or away from the object to allow the object to be placed then the balloon to be inflated to be functional and to hold the object tight in the proper position.

They may be made from adjustable pads. So that initially the pad is kept away from the object to allow the object to be placed inside the box then after the object is in place, the pad will be pushed forward by various means such as handles etc. In order to be pushed to act and hold the object tight in the proper position. In example shown in this figure the pad means, Pad is away from the object when the front wall is open, but with the closure of the door the pad means will force the object toward the rear wall and keep it stable.

Any restraint means which can be used for keeping the objects in place securely.

Combinations of Various Means for Protection and Holding the Object Position.

Importantly, the unit may have restraints that will be placed when the object is in place and the front door is open and then after the object is properly restrained the front door will be closed to further keep the object in stable position with use of its pad means etc. The unit may have means such as snaps and screws in order to allow a pad means or a spring means or a restraint means to be pushed or screwed in order to make a compression against the object for holding it in the position.

Importantly, the use of these pads, balloons or the restraint means are not limited to the front door, or nay parts since these means may be also placed in other areas such as the back wall the top wall etc. In order to make the box means more hospitable and safe for the object being placed.

This figure also shows a handle, R-Hand that has two ends and one end is attached to the ramp by a hinge means and the other end is removably attached to the body of the carrier by a detachable, re-attachable means such as a hook and loop fastener. The detachable end of this unit allows the user to hold it and pull up the ramp without the need for bending. This will prevent from back discomfort. After the closure the free end of the R-Hand will be attached to the body of the carrier by another detachable re-attachable means such as a hook and loop fastener. This handle may have an adjustable body to allow it to be longer or shorter.

Figure 5:
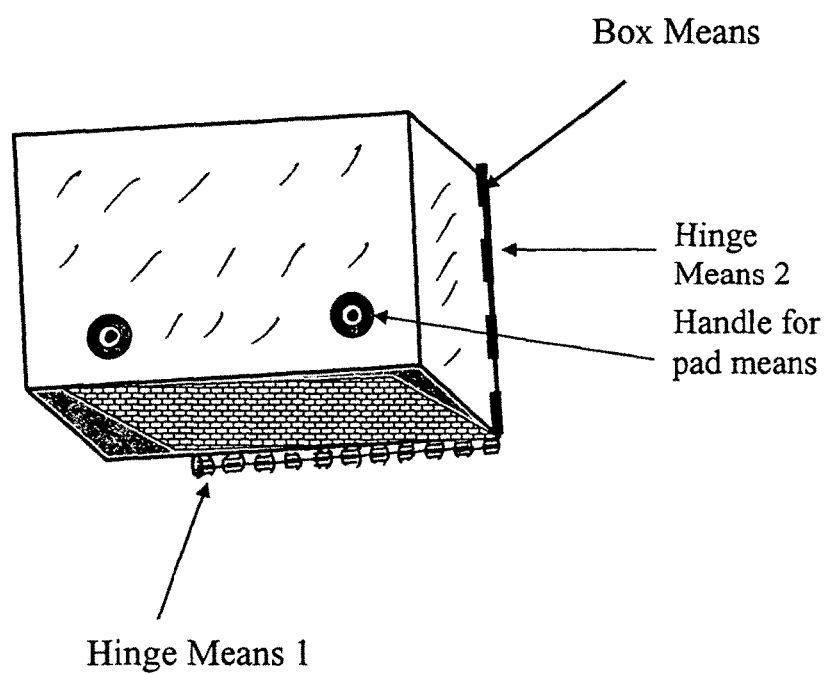
FIG. 5. Shows specifically the position of the hinge means 1, in the base and the Hinge Means 2 located on the side of the box means.

FIG. 5. Shows specifically a box means, Box Means that is placed on a system of attachment means shown at FIG. 3. In this figure the position of the hinge means, Hinge Means 1 is shown, located in the base of the unit. This hinge means allows the whole unit, (the base and the box=carrier means) to be tilted forward in order to allow the rear of the car such as the trunk to be accessed. Also the position of the hinge means, Hinge Means 2 is shown located, in the vertical edge of the box means, Box Means. This hinge means allows the box means to be rotated away from the rear of the vehicle to the right side of the car. The FIG. 5 also shows handle means on the front wall of the box that are attaches by screw means to a pad means inside the box means. So that by rotation of the handle the screw means will move the pad means forward in order to engage with the unit inside the box means and to compress the object for holding it in the position. The rotation of such screw means in the opposite direction will move the pad means away from the object inside. Please note that if the box means is attached to the rear door of a vehicle such as an SUV, and the door swings sidewise, then the use of the hinge means will not be needed and they can be eliminated from these units. Importantly for the purpose of holding the objects inside the box beside the pad means other means such as snaps means, handle means, spring means or a restraint means and similar may be used singularly or combined for holding the units inside the box in proper safe position.

Figure 6:
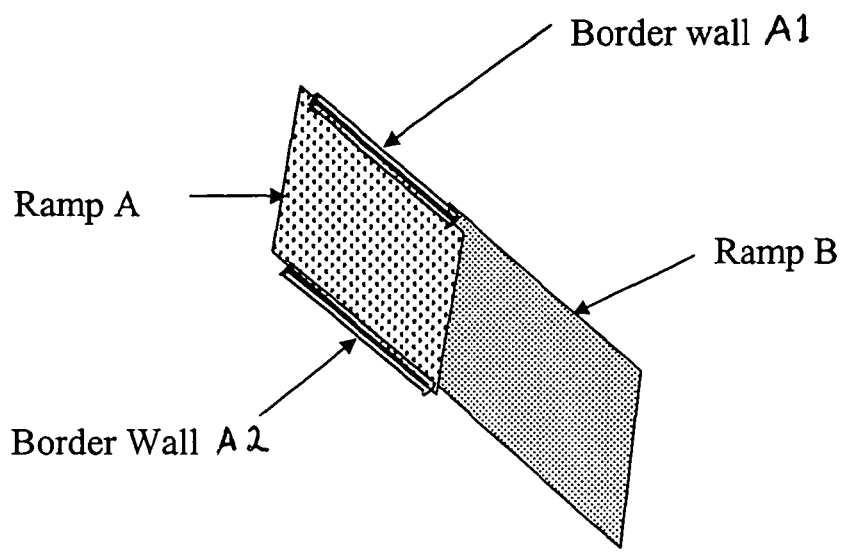
FIG. 6. Shows a ramp means that consist from combination of two pieces which one of them slides into the other.

FIG. 6. Shows schematically a ramp means that consist of combination of two parts which one part slides over the other. This method allows the length of the ramp to be modified. In this figure the ramp, Ramp A has borders, shown as Border Wall A1 and A2 which allow the ramp, Ramp B to slide into it. This method is for allowing the length of the ramp means to be adjusted. In another method the ramp may have two pieces which folds over another.

Figure 7:
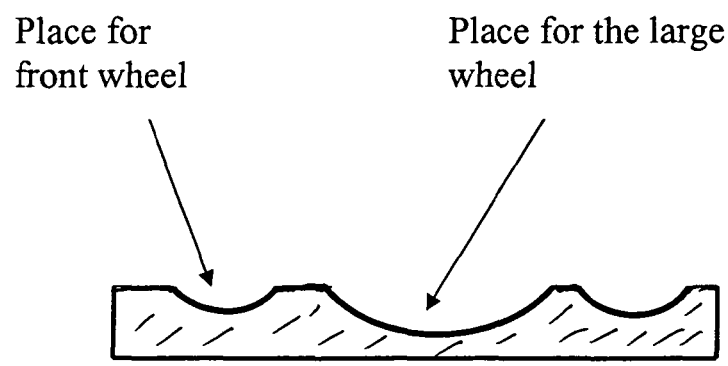
FIG. 7. Shows schematically a cradle means for the floor of the box means, so that it will keep the objects inside more securely.

FIG. 7. Shows schematically a cradle means, which is designed to be placed on the floor of the box means, so that it will function in keeping the objects inside more securely. This unit for example is designed to allow a wheel chair to be wheels on it and it will accept the wheels of the wheel chair and will prevent them from moving. The place for the smaller front wheels and the place for the large wheels are shown.

Figure 8:
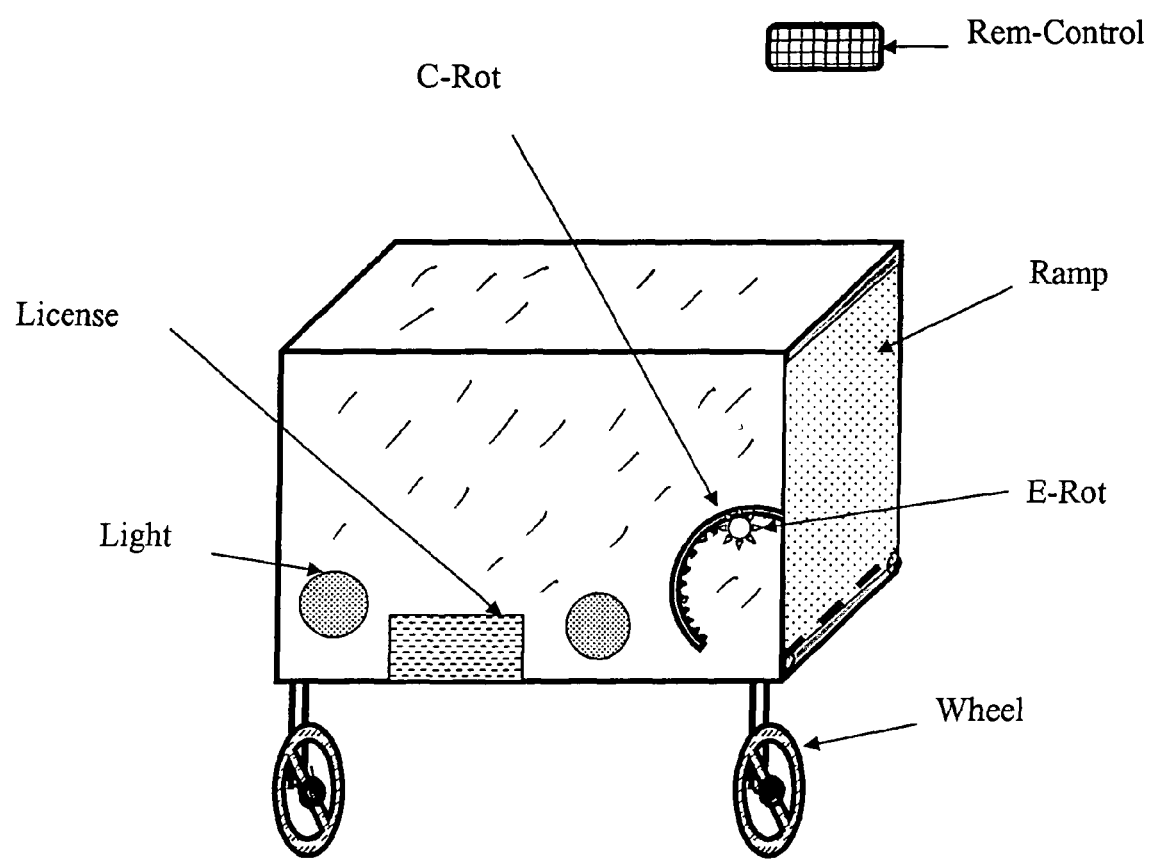
FIG. 8. Shows schematically a modified version of a carrier shown at FIG. 1 which is equipped with wheels.

FIG. 8. Shows schematically a modified version of a carrier means shown at FIG. 1 which is equipped with wheels so that it allows the weight of the box means to be tolerated and transmitted to the street.

The unit may have more than one set of wheels. Also this model shows a version which an electrical method is utilized in order to open and close the door, Ramp automatically. This will eliminate the manual work for opening and closing of the ramp and is more useful when the door is heavy or the user prefers not to open or close the door by hand. The prototype of this unit is made by having a C shaped piece, C-Rot which has the engagement means, such as teeth on it and comes in contact with the teeth of the matching wheel, E-Rot from an electrical motor. So that the rotation of E-Rot will rotate the C-Rot and since the C-Rot is attached to the door means, Ramp, thus it will open or close the Ramp by use of the electrical engine means. This unit may be further intensified by use of a remote controller, Rem-Control of the electrical motor which allows the ramp to be opened and closed. This carrier means will simplify the use of this unit and will be beneficial in cases which further simplification is needed. This model will be more useful for the movement of units such as electrical scooters etc. This figure also shows the light means, light that would be connected tot he signal lights of the vehicle. Also has place for a license plate, License.

Figure 9:
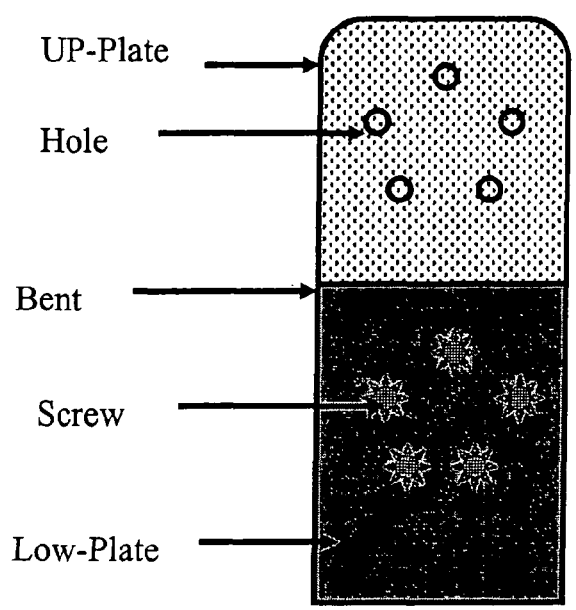
FIG. 9. Shows schematically an adaptors which allows the existing attachment means of a vehicle to be modified for use with this carrier.

FIG. 9. Shows schematically an adaptor means which allows the existing attachment means of a vehicle in the rear such as place for holding the spare tire to be modified for allowing attaching to the rear of a carrier means shown at FIG. 1. In this figure an upper plate, UP-Plate has holes, Hole which matches the location of holes from the site for mounting the spare tire. This allows this plate to be placed and screwed into the place for the spare tire. This plate means has a curved or angled area, Bent which provides a vertical distance between the first and second plate. Then the continuation of the first plate makes the lower plate, Low-Plate which is equipped with a set of screws, Screw, designed to allow the rear wall of the box means to be placed and screwed to this plate in order to be secured. This modification will allow the height of the box means to be adjusted in order to allow the ramp to be in a proper position to allow it to be easily placed on the ground for use. Importantly, the shape of this unit may be modified with various bends and shapes in order to allow it to be useful in different models of vehicle, and various positions of the attachment means. In the cases which the tire mounts to the bottom of the vehicles this unit may have a rectangular bent.

Figure 9A:
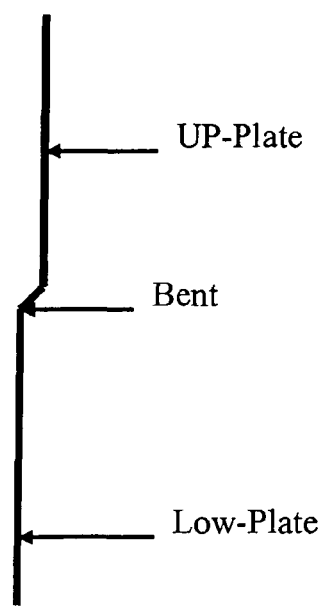
FIG. 9A. Shows schematically the side view of the adaptors shown in previous FIG. 9.

FIG. 9A. Shows schematically the side view of the adaptor means shown in previous FIG. 9. In this figure the upper plate, UP-Plate the angled area, Bent and the another plate, Low-Plate are shown. Again importantly, the angled area, Bent will have different sizes.

Figure 10:
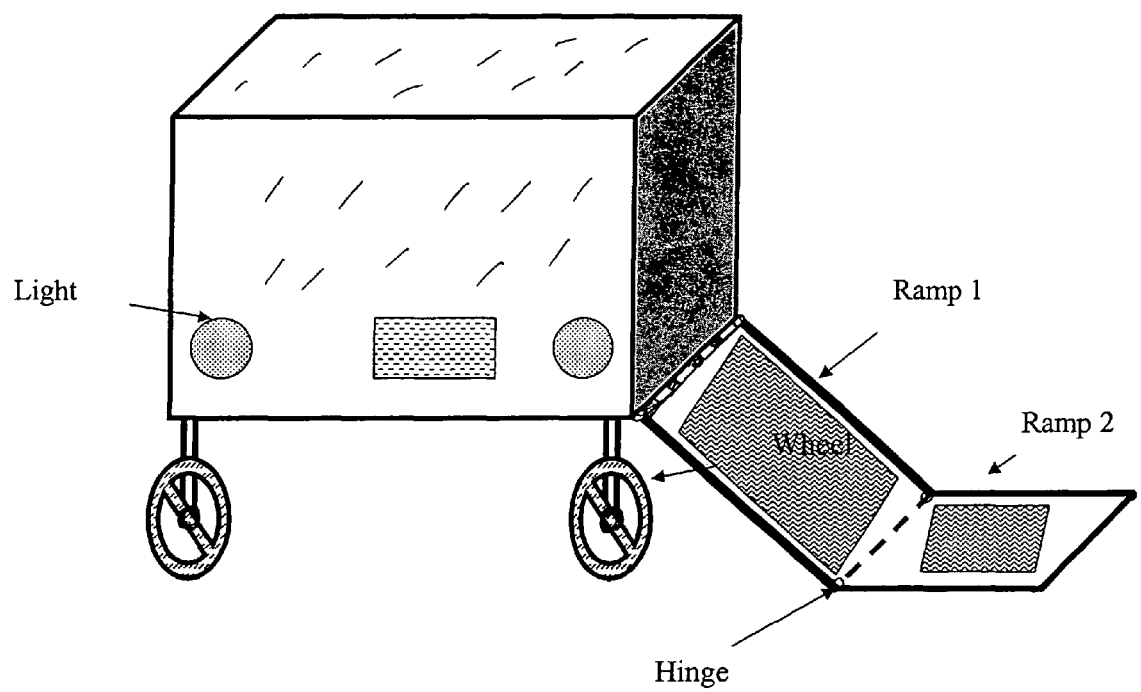
FIG. 10. Shows a carrier shown at FIG. 8 with a door which consists from two pieces that allows one to be placed on the ground.

FIG. 10. Shows a unit similar to the version of a carrier shown at FIG. 8 except this door of this unit consists from two pieces that allows one piece, Ramp 2 to be placed on the ground to facilitate the movement of the scooter to the carrier and prevent from unwanted movement of the ramp. This provides a steady unit. After use, the Ramp 2 will fold on Ramp 1 and close. The surfaces of these ramps are covered with materials to prevent slipping of the scooter. The hinge, Hinge, is also marked.

Figure 11:
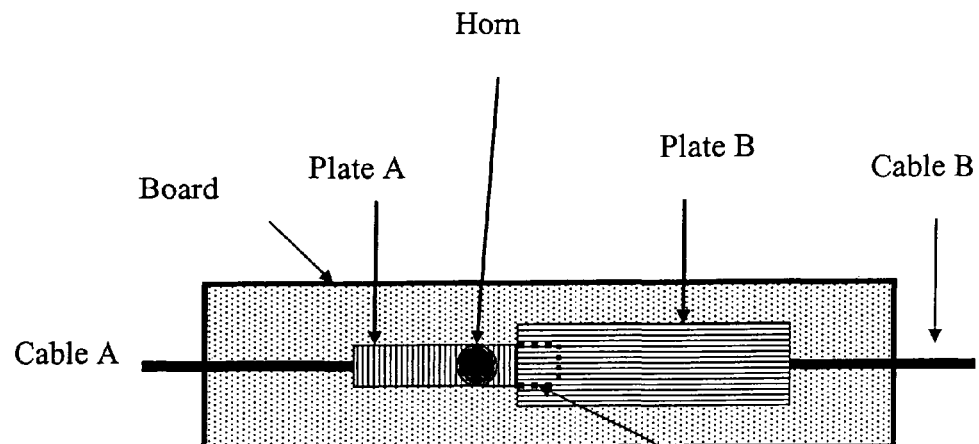
FIG. 11. Shows a method of making an electrical scooter to be placed inside a carrier in a controlled manner to prevent it from hitting the opposite wall.
Figure 12:
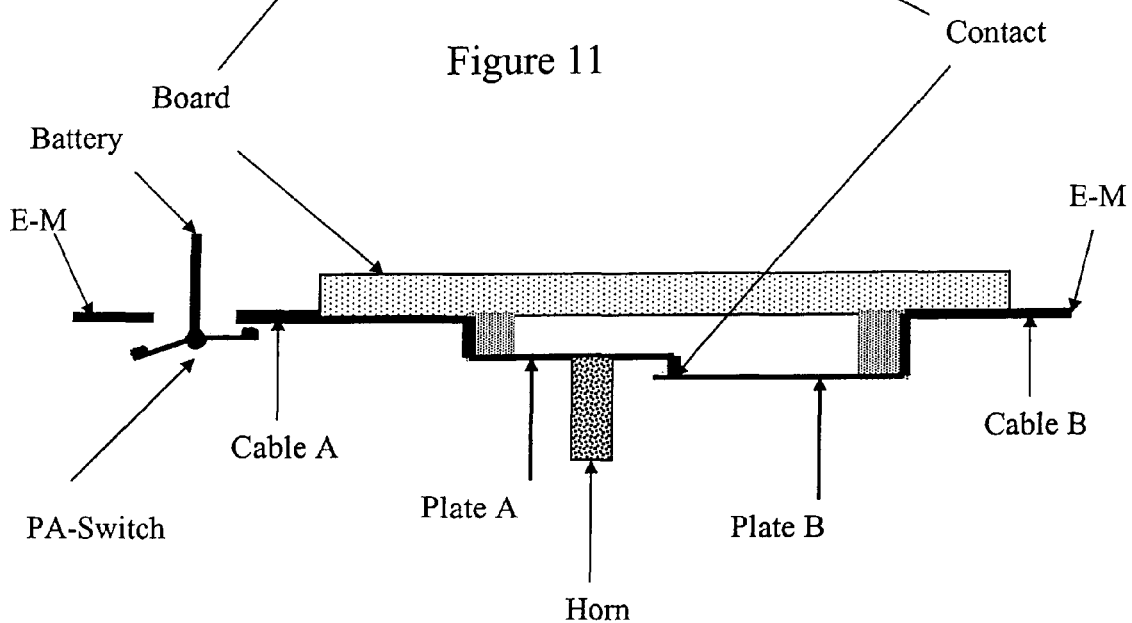
FIG. 12. Shows schematically the top view the unit shown at previous figure and gives the position of various parts.

FIG. 11. Shows schematically a method of making an electrical scooter to be placed inside a carrier means and be kept in proper position inside without hitting the opposite wall, without control to damage. This figure shows the front view of a unit consisting of various part such as a board, Board which holds two electrically conduction spring plates shown at Plate A and Plate B. These plates are electrically conductive and connected to the electrical cables, Cable A and Cable B and are in contact electrically at point Contact. Per design the plate, Plate A will separate from Plate B to disconnect the electrical system when the piece, Horn is pressed, thus it will disconnect the electrical current coming from Cable A to the Cable B. The unit has also a switch, PA-Switch which is shown at FIG. 12. This unit will be attached to the front bumper of the electrical scooter and the main cable from the electrical system of the scooter will be cut and electrically connected to the free end of Cable A after via PA-Switch. The other end of this cable will be attached to the Cable B and to the electrical motor, E-M of the scooter. The method of use is explained in more details at FIG. 12. Shows schematically the top view the unit shown at previous figure and gives the position of various parts. This figure also shows a parking switch, PA-Switch that is designed for use during the process of parking. So that when the electrical scooter is being placed inside a carrier this switch will be turned on to make the parking system functional. In this figure a cable coming from the scooters battery, Battery attaches to this switch. Originally this switch will connect the battery to a cable that is attached to the electrical Motor of the scooter, E-M and this makes the electrical circuit complete and functional. When the unit is being moved into the carrier to be parked inside it the parking switch, PA-Switch will be turned to the parking mode to connect the battery, Battery to the Cable A. Thus the electrical current will go through the system shown in this picture and finally reach the electrical motor of the scooter, E-M via the cable, Cable B. Then the scooter will be driven up into the carrier box means and the horn, Horn will come in contact with the left wall of the carrier and force of contact will press the horn, Horn and it will separate the plate, Plate A from the Plate B to disconnect the electrical system. The disconnection will stop the E-M and the movement of the scooter will stop. Spring means and similar things will be added to this system to allow a predicted and controlled contact of the horn, Horn with the left wall to prevent damage. When the rider wants to remove the scooter will turn the switch to the riding mode and the unit will be functional till next parking time comes.

Figure 13:
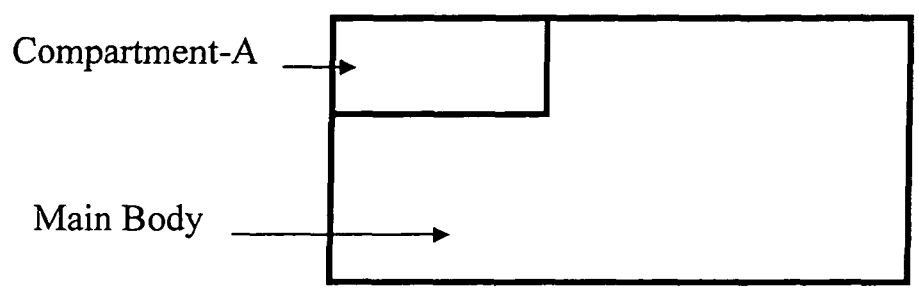
FIG. 13. Shows schematically the front view a box means that has a compartment for placement of other stuffs.

FIG. 13. Shows schematically the front view a box means that has a compartment for the placement of things such as bags or similar things. This part is to facilitate the placement of things which the user may carry. This compartment may be more than one and its shape, size and place inside the box means may vary.

FIGS. 14 and 16. shows schematically the cross cut; FIG. 14 and top view, FIG. 16 of a L-shaped long (about 40-60 inches long) metal piece, that consist of two rectangular pieces (of about 40-60 inches long and 3-5 inches wide sheets of metal) which have joined together to make this L shaped unit. The first rectangular piece is a horizontal, long, flat sheet, shown at HZS-A and the second rectangular piece makes a vertical wall, shown at VW-A The horizontal, flat rectangular sheet, HZS-A has holes, such as HO-A1 and HO-A2 which allow screws to go through for being fixed on the surface of a ramp shown at FIG. 18. Note the ramp shown in FIG. 18 has two slits, shown at, SLT-1 and SLT-2, designed for allowing screws to go through the horizontal part of the L-shaped pieces and with the use of nuts to fix the L-shaped units on the surface of the ramp securely. A sister unit of this first L-shaped unit is shown on FIGS. 15 and 17 which are a mirror image of the unit shown on FIGS. 14 and 16. The fixation of these two sister pieces on the surface of the ramp shown at FIG. 18, will create a mini canal shaped passage shown at FIGS. 19 and 20, at PASS-A and PASS-B. Designed to accept the wheels of the incoming carrier unit.

Importantly, these L-shaped pieces may be also placed on the upper surface of the floor of the box means so that the wheels of the carrier or similar unit can move into the box and sit on top of these L-shaped units. In such models the L-shaped units may have a cushion means shown at cush located in the space between the top of the floor and lower surface of the L-Shaped units for functioning as a cushion or a spring means. This design is for absorbing the vibrations and movements of the carrier when it is sitting and being moved inside this box means. Thus the system with cushion means is particularly designed to be used inside the box means when the carrier means is sitting inside these units. These cushion means will prevent from the extra up and down movements of the carrier means inside this box means when the automobile is moving. Importantly please note even though L-shaped units are introduced in these figures and the application, however, the main idea is having vertical walls or walls or barriers of any form on the upper surface of the ramp, thus this may be even done by use of other means such as only vertical wall with having shaped tongues going through a properly sized slots on the ramp to keep them in vertical position or having screws in the lower surface of the vertical walls for fixing them on the ramp in vertical position or even welding the walls on the ramp or use of other fixing means which may be used for achieving this purpose. Also note that that in some cases only one vertical wall may be used for directing the incoming units: Stroller to follow the dissection so that this goal may be achieved with use of a minimum of one wall.

Figure 18:
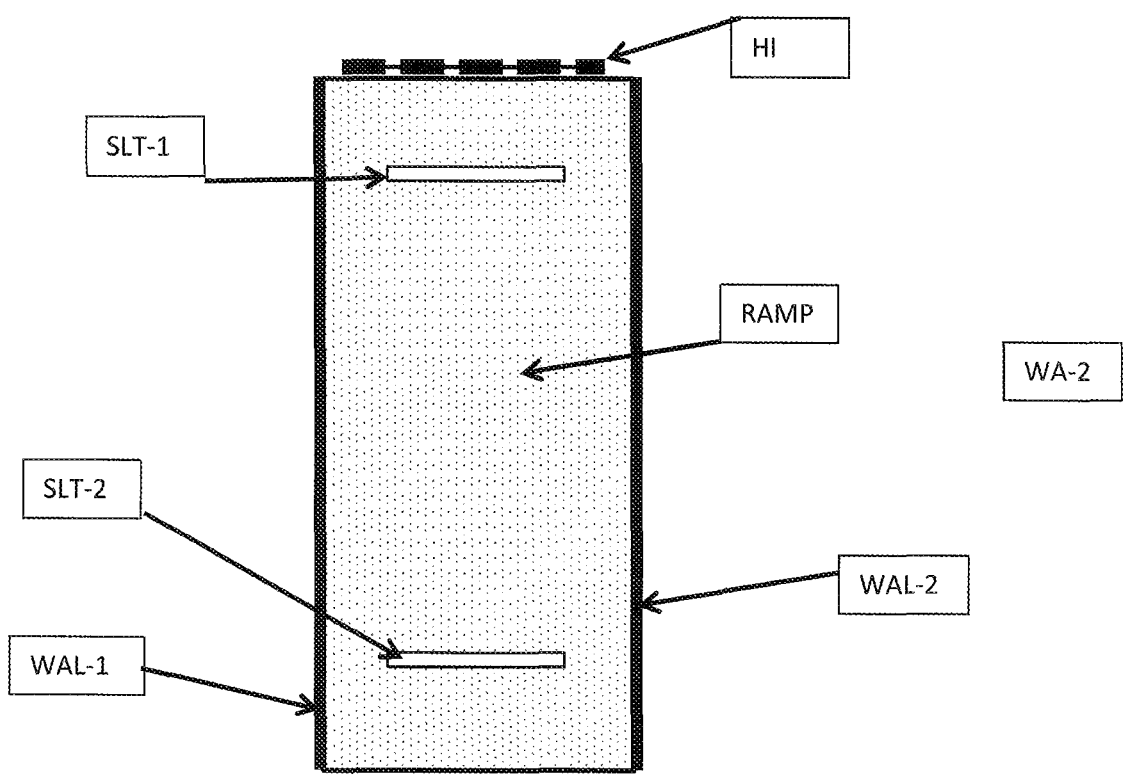
FIG. 18. Shows the top view/upper surface of a body of a ramp means.
Figure 19:
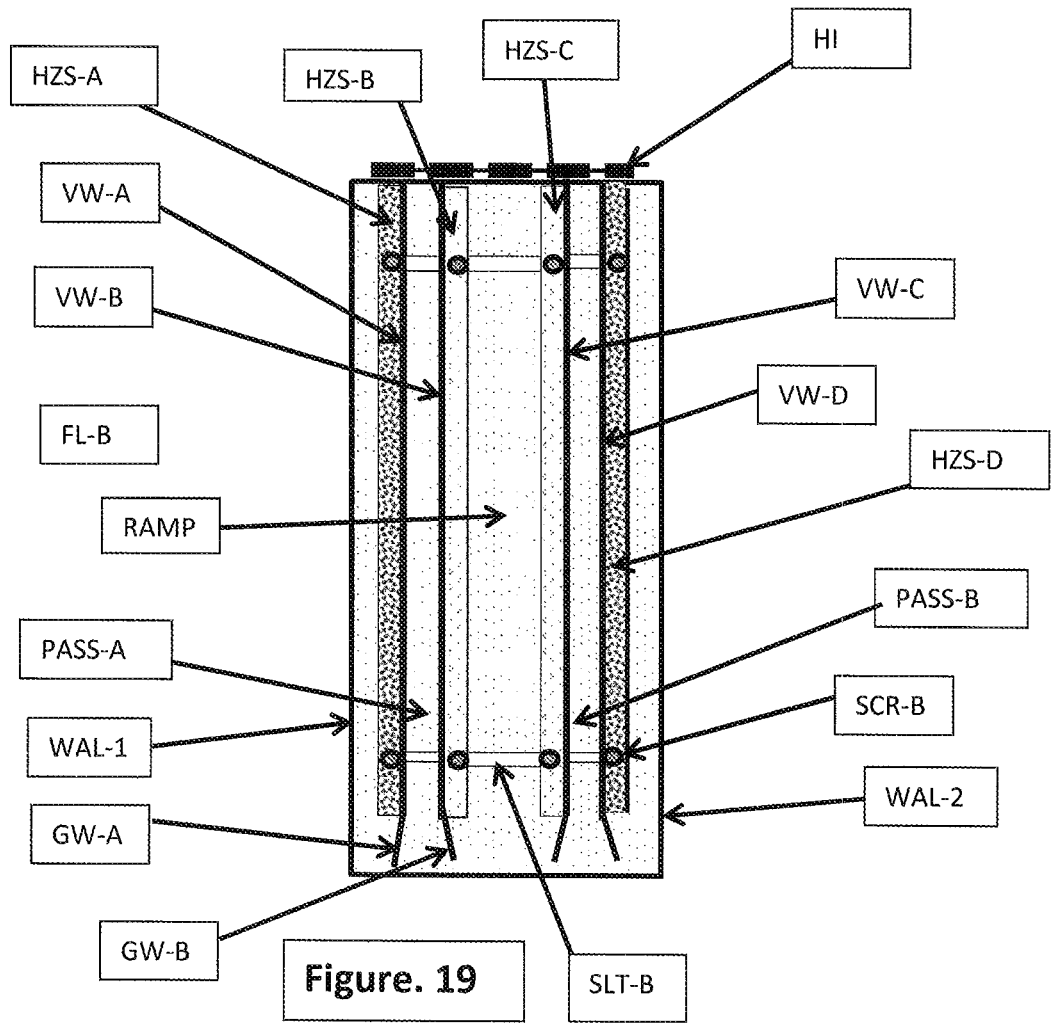
FIG. 19. Shows a ramp with four L shaped means attached creating two canal type passes for the wheels of the strollers to role inside.

FIGS. 16 and 17 are designed for being fixed on the surface of the ramp shown at FIG. 18. By fixing two L-shaped pieces, such as LS-A and LS-B shown at FIGS. 16 and 17 it will create the canal type pass as mentioned before at FIGS. 14 and 16 and a parallel unit shown at pass-A and PASS-B and PASS-B at FIG. 19 which allows the wheels of the incoming unit to be guided inside these canals and FIG. 19. Shows schematically a modified ramp shown at FIG. 18 which has four L shaped means shown at FIGS. 14 to 17 secured on its surface for creating the passes explained earlier for facilitating the entrance of the upcoming wheeled units and their movement inside the carrier means shown at shown at FIG. 21. So that they have created the two parallel passes PASS-A and PASS-B. Note the lower end of the vertical walls of the L-shaped units has an angled small wall such as GW-A and GW-B designed to function as an initial wider opening for facilitating the entrance of the wheels of the incoming carriers into the passes. Note, the horizontal metal sheets, HZS-A and HZS-B of the L-shaped units will be secured on the surface of the ramp, RAMP as shown in FIG. 19 by use of the screws such as screw, SCW-A shown better at FIG. 20 going throw the holes, HO-A1, HO-A2, and HO-B1 and HO-B2 as well as through the slits SLT-1 and SLT-2 from the body of the ramp, shown in the FIGS. 16, 17, 19 and 20 for creating the unit shown at FIGS. 19 and 20. Importantly, note that this method allows the position of the of the L-shaped pieces on the ramp, RAMP to be adjusted, so that the distance between the vertical walls, VW-A and VW-B, VW-C and VW-D can be easily adjusted independently, for allowing different sized wheels as well as wheels which have different distances from their counterpart to be used in these ramps. This is one very important method and means of these new units presented in this application. Note importantly, by this method.

A. The distance between the vertical walls, VW-A and VW-B can be adjusted independently from others.

B. The distance between the vertical walls, VW-B and VW-C can be adjusted independently from the others.

C. also the distance between the vertical walls, VW-C and the VW-D can be adjusted independently from the others too.

Thus this method allows the carriers with different width of the wheels also with different spaces between their wheels from each other to be easily pushed by using this ramp when the initial adjustment and placement of the L-shaped walls is done on the ramp to match those. In other words this allows the creation of a universal type of the ramp, which can be used with different carrier means with different sized wheels and distances when closed. Importantly, in some cases, the ramp may have more than two passes in order to accommodate unusual incoming units.

Figure 20:
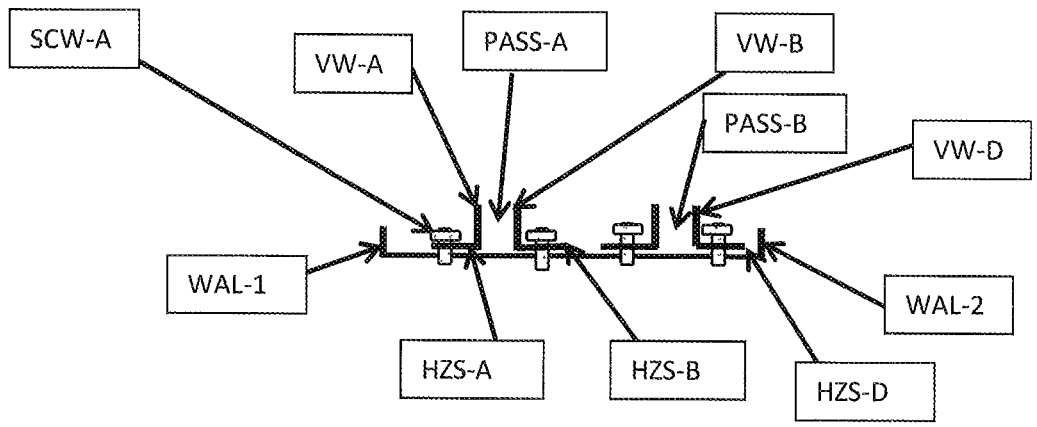
FIG. 20. Shows the side view of the ramp means shown at FIG. 19.

FIG. 20. Shows schematically the side view of the ramp shown at FIG. 19. The purpose of this figure is to show how the L-shaped units are attached and fixed on the top surface of the ramp for making the passes.

Figure 21:
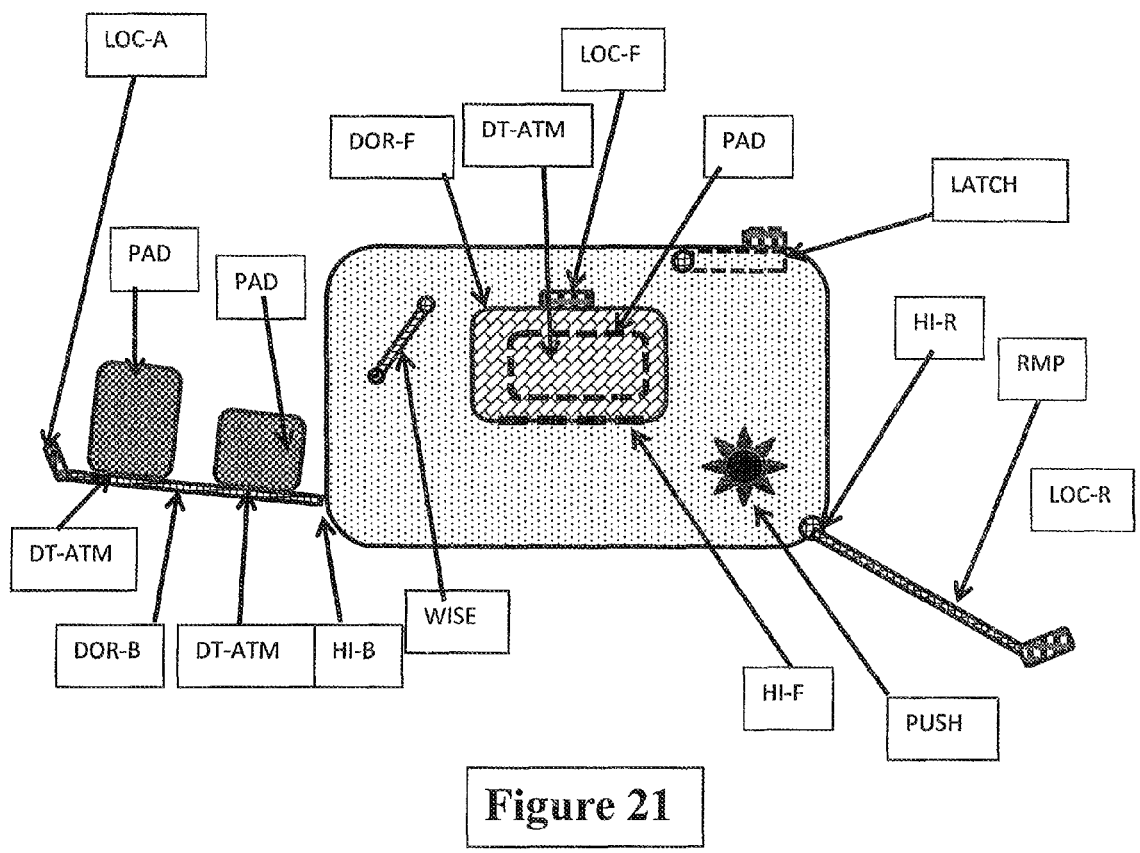
FIG. 21. Shows the front wall of a box means which has opened doors in both sides and one in front.

FIG. 21. Shows schematically the front view of a box shaped carrier means which consists of a box means similar to the unit shown as main model. In this view the box appears like a rectangle with curved edges. This box means is designed with having multiple doors, such as A. The first door is shown schematically in the right side of this figure and is shown at ramp, RMP.

B. A second door which is located in the opposite wall of the carrier box compared to the ramp, here shown at DOR-B.

C. The third door which is located in the front wall of this box means and here is shown at door, DOR-F D. The box may have one or more other doors, if needed, for the purpose of allowing entrance. To allow access to the inside of the box means for adjustment and securing of the units, placement of objects and other intentions. Please note:

1. The first door in the side of this unit functions as the ramp, RMP. And it is altered and designed in order to function as a ramp, it is hinged to the body of the box by hinge, HI-R., so that it can be opened to function as a ramp and closed to function as a wall of this box means. This side wall has a lock means LOC-R. Which allows it to be locked to the box means, box means when it is closed. A modified version of this ramp is shown in FIGS. 19 and 20.

2. A second door, located in the opposite wall of the carrier means, here shown on the left side at DOR-B. is also a side door and side wall which is also hinged to the body of the box means at hinge, HI-B so that this wall, also can be opened for allowing access to the inside of the carrier box means. This wall, DOR-B has numbers of pad means, PAD, designed to engage with the body of the incoming unit such as a stroller for the purpose of holding them inside the carrier box in a controlled position and preventing it from jiggling and unwanted movements inside the carrier box means. Two of such pads are shown PAD1 and PAD2 as examples of these pad means. Importantly, the pad means PAD are attached to the surface of the door, DOR-B on a detachable re-attachable basis, shown at DT-ATM so, that the pad means can be adjusted and repositioned or exchanged. This detachable-attachment means may be made from different means such as snapping means, screw means, magnet means, Velcro™ and similar so that it allows these pad means to be adjusted, re-positioned, exchanged or a new pad means or unit with different size and shape and function to be attached to door means, DOR-B. for functioning for the purpose which is designed.

3. A third door shown on the front of the box at DOR-F is also hinged to the body of the box by hinge, HI-F. This front door can be opened and closed for allowing the access to the inside of the box means to occur and it will be locked to the body of the box by use of lock, LOC-F. The opening of the door F allows access inside the box means for various reasons such as the manipulation of the means inside the box, for securing the carrier unit, placement of materials or any other purposes. This door also will allow different latches or a restraint means, pads and interventions means of any kinds to be used for securing the position of the incoming unit inside the box. These means, in general are designed to prevent from the object inside this box from jingling, vibration and extra movements. The inner surface of the wall of this door may have means such as pads, shown at PAD or grabbing means attached to it on a permanent or detachable, re-attachable basis. These pad means, PAD may also be a grabbing means, a fixation means and similar also designed for participation in securing and handling of the carrier means inside the box. Also this door allows placement and removal of other objects inside the box means. Furthermore the box means may have other sorts of securing means such as a latch means, LATCH shown in the upper right corner of this figure, which in this case consists of a fork shaped body (cannot be recognized in this figure) and is hold by a magnet, MAG on the top wall of the box. The first end of this latch, LATCH is hinged to the upper body box by use of the hinge, LCH-HI. This method and means allows the release of this latch means after the incoming unit is placed inside the box so that the right and left probes of this latch means will engage on the sides of the carrier means and prevent it from jiggling and extra movements. Importantly, also means such as vise means, VISE may be used with its control means or a handle which extends outside of the box means so that the vise means can be engaged and be functional by rotating its handle, VISE-HA around the hinge of the vise, VISE-HI so that by clock wise rotation of the handle will cause movements the paws of the vise means toward the sides of the object inside for holding it tight. Conversely, the contra-clockwise rotation of the handle of the vise will disengage and move away the paws from the object inside and allows it to be free. The first door, which functions as a ramp, Ramp, may have the canal shaped modifications shown in FIGS. 19 and 21. For creating the parallel pass means shown at PASS-A and PASS-B so that the wheels of the incoming unit to be guided inside these pass and be directed easily inside the carrier box without allowing the wheels to sway away from the proper direction. The push means shown at PUSH is designed to rotate and engage with the will allow it to be rotated so that by clock wise rotation of the PUSH will movements its screw body forward and towards the side of the object inside for holding it tight. Conversely, the contra-clockwise rotation of the screw means PUSH will move the end of the push away from the object inside and allows it to be free.

Figure 22:
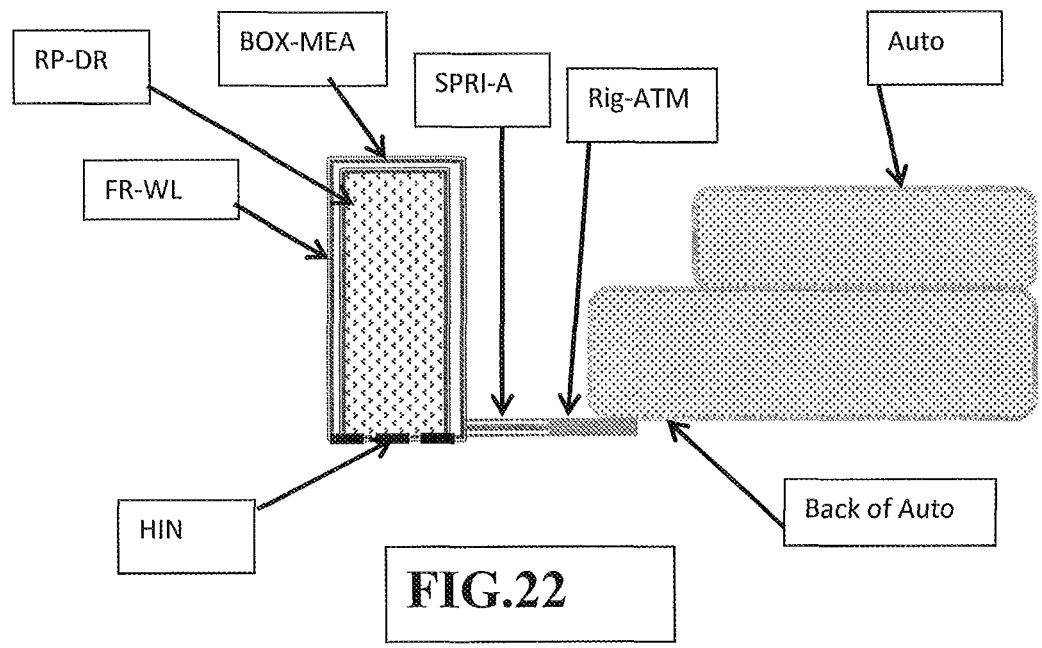
FIG. 22. Shows a carrier means with an attachment means to the car which has a spring zone and a rigid zone in its body.

FIG. 22. Shows schematically, a carrier means similar to the main model explained in the main text which is attached to the rear end of an automobile shown schematically in the right side by the connection means which consists of.

A. a rigid attachment means shown at, Rig-ATM, which is not flexible, and is made from steel.

B. A flexible and spring type piece, SPRI-A which attaches to the box means, BOX-MEA and also to the rigid attachment means Rig-ATM. This piece of spring means allows the box means the BOX-MEA to move up and down with some hesitancy compared to the rigid piece and this mechanism gives the advantage of preventing the box means to be traumatized. This figure also shows the door which functions as the ramp shown at the RP-DR which is hinged to the body of the box, BOX-MEA by the hinge means HIN. The front wall of this box means is shown at the FR-WL.

Figure 23:
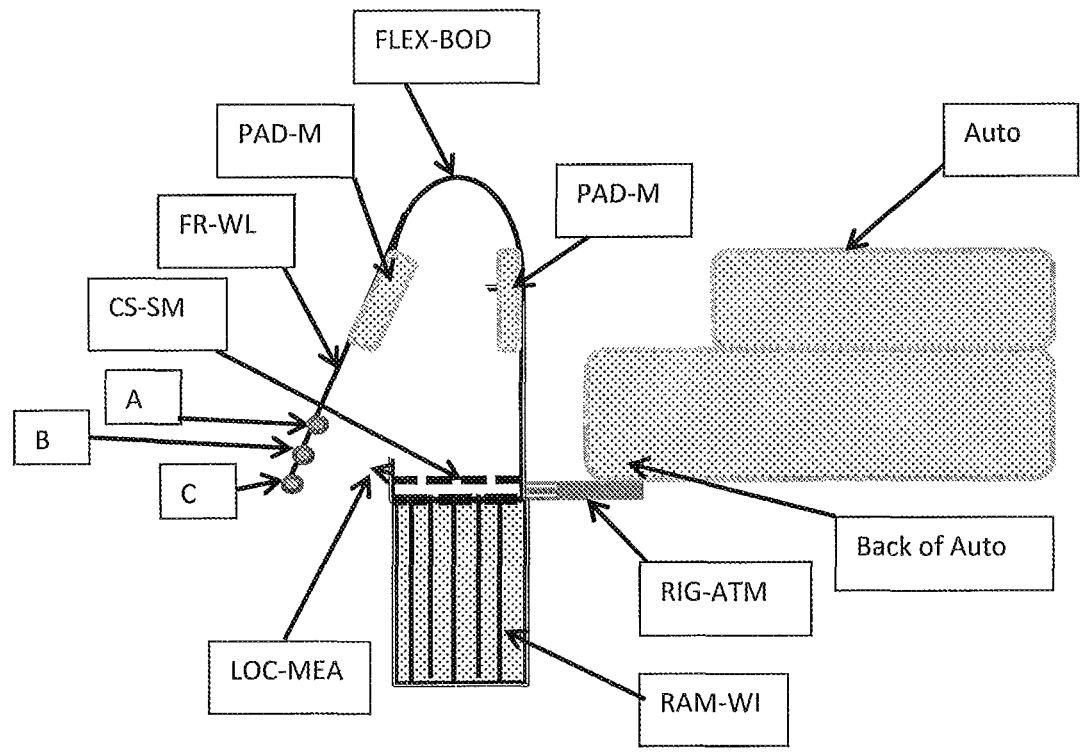
FIG. 23. shows a carrier means with flexible upper and front walls.

FIG. 23. Schematically shows another feature of this new invention which consists of the following. First. The rear, wall, the upper wall and the front walls of this unit are made of a flexible, spring type sheet means which has a series of pad means, PAD-M designed to engage with the incoming unit such as a stroller and to keep them inside the box securely. The flexibility of these walls allows the front wall of this unit shown at FR-WL, which can be:

A. closed by engagement of the locking means shown at LOC-MEA from the base of the box means and the front wall, FR-WL of this box means for tightening of the box means and keeping the unit stroller inside safe. Importantly, the engagement of the front wall, FR-WL, with the lock means, LOC-MEA may be chosen to happen in different zones, such as, A, B and C. from the front wall FR-WL. This method allows the proper size of cargo space to be chosen to prevent from a loose unit inside the box means. Thus, after the placement of the unit: stroller inside the box means the front wall, FR-WL will be pulled down to squeeze the space under the wall and to touch hard the incoming unit, stroller and then to engage with the lock means LOC-MEA with use of proper zone, A, B or C for keeping the unit inside securely. This figure also shows some other specifics of this new version which consists of a cushion—spring means shown at CS-SM which consist of a cushion means designed to absorb the motions of the unit inside the box. Also the CS-SM unit may have an upper surface designed to function as a cradle as shown in FIG. 7 and keep the incoming carrier means inside and prevent it from moving forward or side-by-side. A lock means shown at LOC-MEA will allow the locking of the front walls to the body of the box means by various locking means. Note the attachment of the lock means, LOC-MEA to the body of the box means can be chosen to be adjustable and be placed either higher or lower on the base than the spot shown so that by using the flexible wall means the space under this wall means can be smaller or larger.

Figure 24:
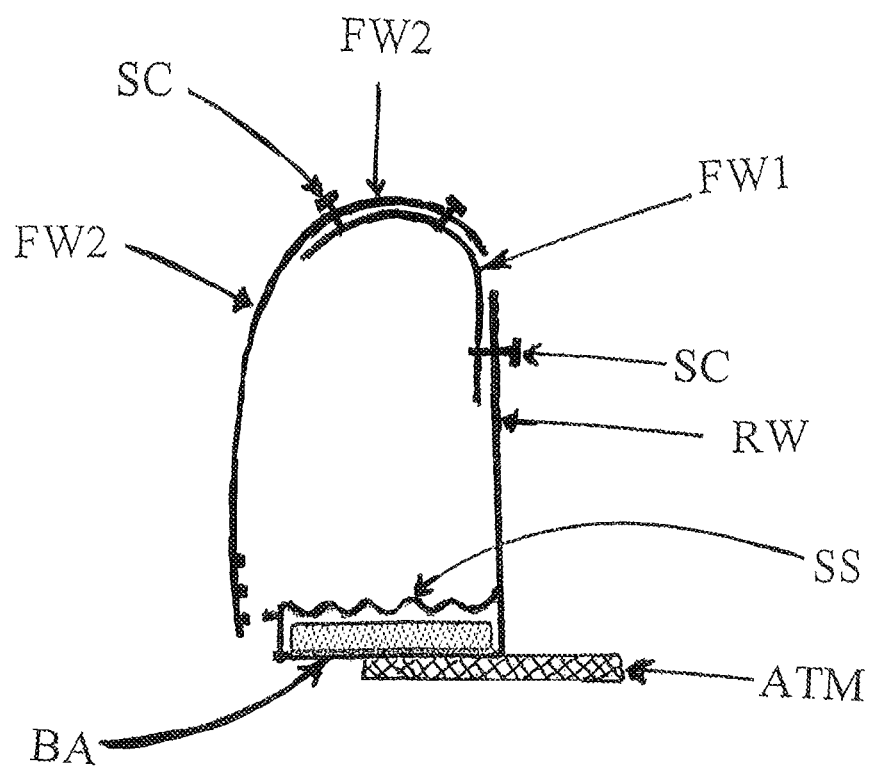
FIG. 24 shows the side view of a box means with a separate flexible front and upper walls and a rigid rear wall.

This figure also shows a ramp means, RAM-WI which consists of a sheet means with an upper surface made of a zigzag or sinusoidal type of body as shown in FIG. 24. At SS. The advantage of zigzag or sinusoidal design is that it will allow the wheels of the incoming unit, stroller to randomly fall inside the space between the raised walls of this zigzag/sinusoidal shape ramp or side of its walls and to negotiate for being moved into the box means with ease. It should be considered that commonly the present strollers make ups allows their wheels to move close to each other or away from each other to a certain degree when they are folded therefore in practice such a negotiation may be possible.

FIG. 24. Shows schematically, the side view of a box means of a carrier means similar to the model shown in FIG. 23 except with new items and options. This unit also consist of.

A. A relatively rigid rear wall shown at RW, which is vertically positioned and attaches to the base and has an attachment means ATM (not shown here) which allows the whole unit to be attached to the rear of an auto. The upper border of the rear wall, RW connects to a flexible upper wall FW1.

Figure 28:
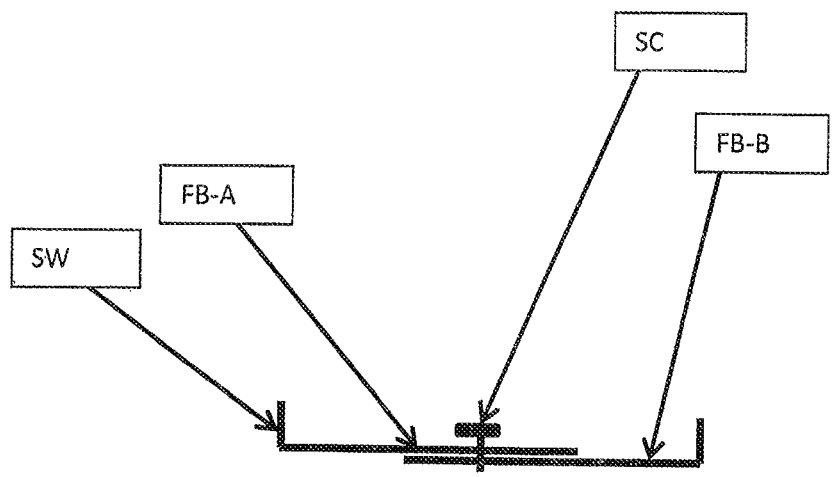
FIG. 28. Shows the side view of a ramp-door shown in previous FIG. 27.

B. The flexible wall FW1 is an independent piece made from a flexible sheet which by itself then connects to another flexible sheet which is designed to make a flexible front wall, FW2. By having an overlapping zone. Importantly, this design allows the zone of connection of the flexible wall FW1 to adjustably attach to the rear wall. So that the area of overlapping the FW1 and the rear wall, RW can change. It can be small or a large zone. Also from the other side of the attachment of the FW1 to the front wall FW2 is adjustable as well, this adjustability also allows the zone of connection of these two to be larger or smaller. A predesigned hole with use of the matching screws allows the attachment of the flexible sheet FW1 to the rear wall, RW and also to the front wall FW2 to be stable. The predesigned flexible sheet allows these walls to flex, bend and be pulled so that the lower end of the front wall, FW2 can be pulled down and attached to the lock means, LOC-MEN from the base of this carrier means unit shown and explained at FIG. 23. Importantly, this method allows the volume of the cargo space under this wall to be modified by deciding the area of the overlapping of the wall FW1 and FW2. For example if this overlapping area is chosen to be large the cargo space will be small. In contrast if the overlapping area of FW1 and FW2 is chosen to be minimal the cargo space will be largest the same mechanism also applies to the attachment of the flexible wall FWland the rear wall RW. Importantly, note in some models most of or the whole part of the rear wall RA of this box means may be also made from the same type of flexible sheet material. Also importantly please note that the flexible walls of this box means may be chosen to be sinusoidal as shown in FIG. 28. Note in FIGS. 23 and 24 the flexible sheet may be made from steel, aluminum or sheets of different metals or manmade materials. Importantly, in some models fabrics, canvas, screens, or PVC materials may be used for the walls when desired and appropriate for the use. In the case of materials such as fabrics and canvas they may be enforced with incorporation of metal screens to prevent them from being cut, or they may be modified in different manners as the need comes. Thus, the walls of the box means in the unit shown at FIGS. 23 and 24 may be made from:

I. Canvas or similar type of fabrics, or fabrics of any type.
II. Sheets made of PVCs and other man-made materials.
III. Screens made of metals, PVCs and other materials.
IV. Sheets of steel or other metals.
V. Sinusoidal shaped sheets of material.
VI. Combination of these materials.
VII. Any other type of materials that can be made and used for this purpose.

Importantly, the following options and means may be used in the units shown at FIGS. 23 24 and 28 and others if apply. Please note these options are whether shown in FIG. 28.

The inner surface of the walls has a series of pad means, PAD shown in FIG. 23-28, designed for engagement with the incoming unit; stroller and prevent it from the extra movements and jiggling inside the box means. For the details of these options please note the FIG. 28. So that similar options will not be repeated.

Figure 25:
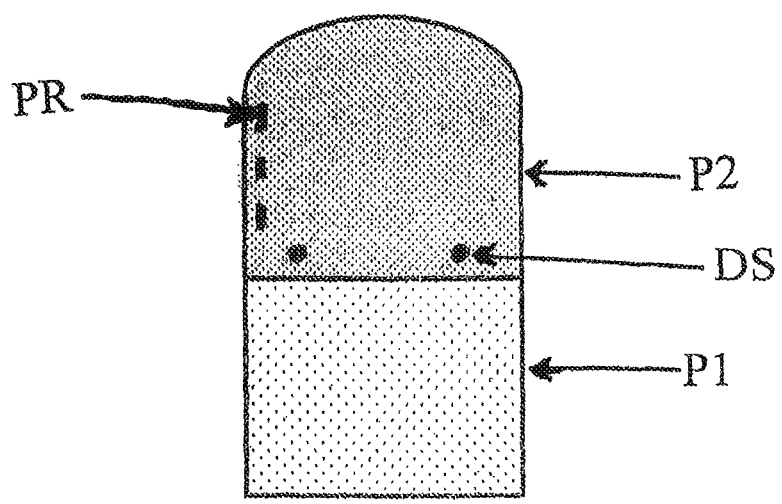
FIG. 25. Shows the rearview of the ramp-door consisting of two overlapping pieces P1 and P2.

FIG. 25. Shows schematically the rear view/lower view of a ramp-door means which consists of two pieces P1 and P2 which overlap each other. This design allows the size of this door which functions as a ramp to be adjusted. In this figure one piece of this door is shown at P1 and is located in the lower side and by use of screws one of them shown at DS to the second piece shown at P2. The piece P2 has its own curved shape in the top in order to fit the curved shape of a flexible top wall of the box means shown on FIG. 24. This door has protrusions shown at PR in the side of the top wall P2. The function of these protrusions is for getting engaged with the flexible front wall and to keeps its edge between the edge of the ramp-door and these protrusions and prevents it from being pushed in.

Figure 26:
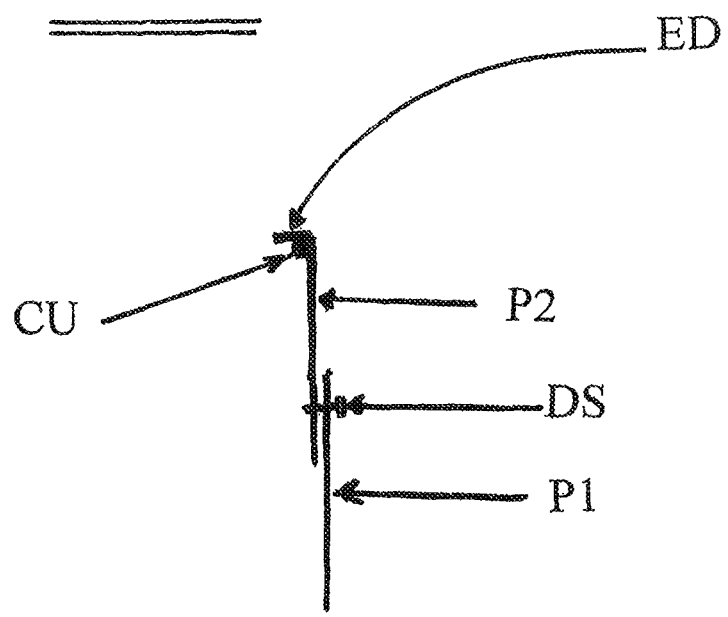
FIG. 26 show the side view of a ramp-door shown in previous FIG. 25.

FIG. 26. Shows schematically the cross cut side view of the unit shown at FIG. 25. In this figure a lower piece P1 is shown which stands adjacent to the upper piece P2 and by doing so it allows the size of the door to be adjusted and be longer or shorter. The upper end of the piece P2, has an angled edge shown at ED which this edge will go over the front door and keep it under itself. A cushion means is shown at CU and is designed to be pressed against the edge of the flexible wall and seal the space in between. Please note that the relative sizes of these two door pieces and their position will be engineered in order to allow one piece to slide over the other easily and make it functional unit. Also one of these doors will have a slit piece will allow the position the screw to be chosen.

Figure 27:
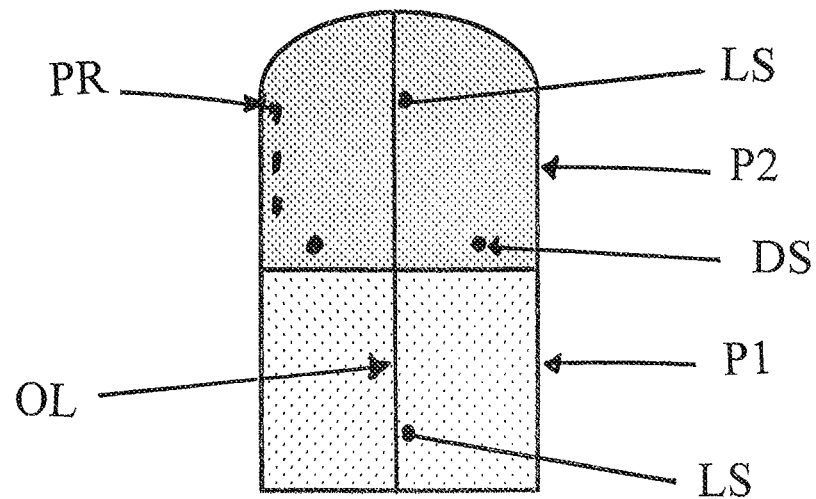
FIG. 27. Shows the rearview of the ramp-door consisting of four pieces overlapping each other.

FIG. 27. Shows schematically the front view of a ramp-door means which is similar to the door means shown in FIG. 25 except this door means has four door pieces which overlap each other. The two pieces of P1, P2 are shown and the have a mirror image counterparts which will attach and overlap each other longitudinally at overlap line OL. This design allows the overall size of this door means which functions as a ramp to be adjusted. Screws such as one of them shown at DS will be used to hold them together.

FIG. 28. Shows schematically the cross cut side view of the unit shown at FIG. 27. And shows two L-shaped pieces, FB-A and FB-B which are overlapping each other and are fixed by the screw SC. Thus by moving these sheets from each other the ramp-door will be wider and by moving them close to each other the ramp-door will be narrower. Side walls one shown at SW will overlap the side of the front and back walls and keep them in control. The sidewalls also will function to prevent the wheels of the incoming unit from falling off. Please note again that the relative sizes of these two door pieces and their position will be engineered in order to allow one piece to slide over the other easily and make it functional unit. Also one of these doors will have a slit piece will allow the position the screw to be chosen. Please note that importantly the door opposite to the ramp-door also may have almost similar p FIG. 29. Shows schematically, the side view of a carrier means similar to the model shown in FIGS. 23 and 24 except the main body of this unit consist of.

A. A relatively rigid rear wall shown at RW, which is vertically positioned and attaches to the base and has an attachment means ATM which allows the whole unit to be attached to the rear of an auto. Importantly note that the point of attachment of ATM is shown to be higher in this model so that the cargo area can be lower and in some cases it will not be high enough to obstruct the access to the trunk of the car. The importance of this issue is that it will eliminate the use of hinges designed to move the carrier box verticality and horizontally as shown in FIG. 5. The rear wall continues to attach to the extension of the flexible upper wall, UW and a flexible front walls, FW, which importantly, is made of a sinusoidal, flexible sheet which also allows this wall to flex and bend so that the lower end of the front wall, FW can be pulled down and attached to the lock means, LB from the base of this carrier means unit shown at BA. Importantly, this method also allows the volume of the cargo space under this wall to be modified. Importantly, note that there is a zone of overlapping of the zone of an attachment of the extension of the upper wall, UW to the rear wall, RW. This design allows the length of them upper wall, UW and the front wall, FW combined to be adjustable, longer or shorter in order to allow the cargo space to be modified. Importantly also note in some models most of or the whole part of the rear wall RW of the box means may be also made from the same type of flexible sinusoidal sheet of material. Also importantly please note that the flexible walls of this box means do not need to be sinusoidal a shown in FIG. 23-24, and may be made from a flexible steel sheet, or a flexible aluminum sheet or sheets of different metals or manmade materials. Even the of fabrics, canvas, screens, and PVC materials and other materials may be used as desired and was appropriate for the use. Again in the case of materials such as fabrics and canvas they may be enforced with incorporation of metal screens to prevent them from being cut, or they may be modified in different manners as the need comes. Thus, the walls of the box means may be made from:
  I. Canvas or similar type of fabrics, or fabrics of any type.
  II. Sheets made of PVCs and other man-made materials.
  III. Screens made of metals, PVCs and other materials.
  IV. Sheets of steel or other metals.
  V. Sinusoidal type of material.
  VI. Combination of these materials.
  VII. Any other type of materials that can be made and used for this purpose.

B. The inner surface of this wall has a series of pad means, PAD designed for engagement with the incoming unit; stroller and prevent it from the extra movements and jiggling inside the box means. Importantly, some of these pad means shown in the left side of this figure may have screw means attached to a handle shown at HA so that by rotating the handle the pad will move forward to be pushed to touch the incoming unit and keep it still and by rotating in the other direction it will move away from the inside unit. Note the body of this flexible wall makes the upper wall, UW and also the front wall FW as well. The flexibility of these walls allows the front wall, FW, to be pulled down and lock to the base of the box means at lock LB in different points, shown at A, B, and C. The engagement of lock, LB with the front wall at point C will make a larger Cargo Space and the point A will make a smaller cargo space and point B will be in between. Also again the point which the end of upper wall, UW attaches to the rear wall, RW is adjustable and makes difference in choosing the size of the cargo space. Therefore, the size of the cargo space and the whole unit can be adjusted for matching the size of the incoming unit. This option may be used in the beginning of the installation of this unit for a given incoming unit: stroller, so that the area under this wall means to match the size of the incoming unit; stroller or the size of the space to be adjusted later.

C. The lower wall of the box means consists of a rigid base, BA which is strong for holding the whole unit and also being attached to the rear wall, RW and an attachment means, ATM, for being attached to the auto. The base unit has a cushion means located on the floor and is designed to absorb the extra up and down movements. Importantly, it has an upper surface made of a sinusoidal sheet, SS which has its own groves and elevated zones. Importantly, the sinusoidal design of the upper surface of the base unit, BA allows the wheels of incoming unit: stroller to negotiate with the upper points and the groves and engage with the groves and raised walls of this floor for facilitating the movement of the incoming unit inside the box. The use of the sinusoidal design for the floor of these units has the advantage that it will make the construction of these units easier and simpler. Importantly, the floor of the box means may have especially designed cradles as shown in FIG. 7 which has its own proper zones and shapes which will match the position, the size and the shape of the wheels and lower parts of the incoming unit, stroller or wheelchair and similar in order to accept, welcome and embrace them for keeping them inside securely and prevent them from moving in the final position. Many types of attachment means may be used to keep the wheels and the whole unit of the incoming unit securely inside the box means sturdy. The cushion means have their own sizes, shapes, and makeups, they may have screw means or other means of manipulation in order to allow them to be pushed for being engaged with the unit inside such as strollers, they may have their own detachable and re-attachable attachment means to allow them to be attached to the inside surface of the rear, upper and the front walls and be positioned in an ideal spot for being engaged with the incoming unit.

D. Importantly in this model the front wall when open also allows a free access into the inside of the box means, so that after the placement of the incoming unit; stroller, the incoming unit can be secured inside the box means by various means and then the front wall to be closed.

E. Various means and models of the securing means some mentioned in this application may be used in these units in order to bring the front wall of this unit closer to the rear wall of the box means in order to squeeze the incoming unit in between and prevent it from extra movements and jiggling. These means may be applied and manipulated from inside or outside of these walls. For example they can be like wise means, C clamps, bands, pulling means, screw means and every other kinds of means that the can be used for the purpose of holding the object's inside this box safe.

F. Of importance is the use of various clamps means, band means, screw means, and every other types of securing means with these units, with either being inside or outside of this box means for a quick engagement with incoming unit: stroller for keeping the unit inside this box means securely and preventing it from extra movements. The control or clamp means may be placed and used from the outside or they may use an outside access for being engaged with the inside unit, stroller for securing it in place.

G. It should be noted that using these models there is need for two doors one in the right side which will function as a ramp door and will be modified to be used with the unit shown in FIGS. 23, 24, 28 and similar. These doors can be adjustable, and such adjustable doors are shown in FIGS. 6, 25, 26 and 27. It should be noted that that the door opposite to the ramp door may also have some or all of the options of the ramp door. The all can be modified to fit the sides of this box means and make a complete adjustable unit for use.

Importantly, all or some of the features explained in the previous application may/will be used and combined with the new versions of these units for making the best possible unit and fit the purpose of a special use. Importantly, note that the side door=the ramp of this box means and the door in the opposite side of the ramp door will be modified and engineered to close the sides of this box means properly and they will have proper means made from rubber or similar to fill the space between these walls and the edges of the flexible body of this box means in order to prevent from passage of the dust and water inside the flexible box means. Also proper locking means will be used to close the doors and walls to the body of this flexible box means.

Figure 29:
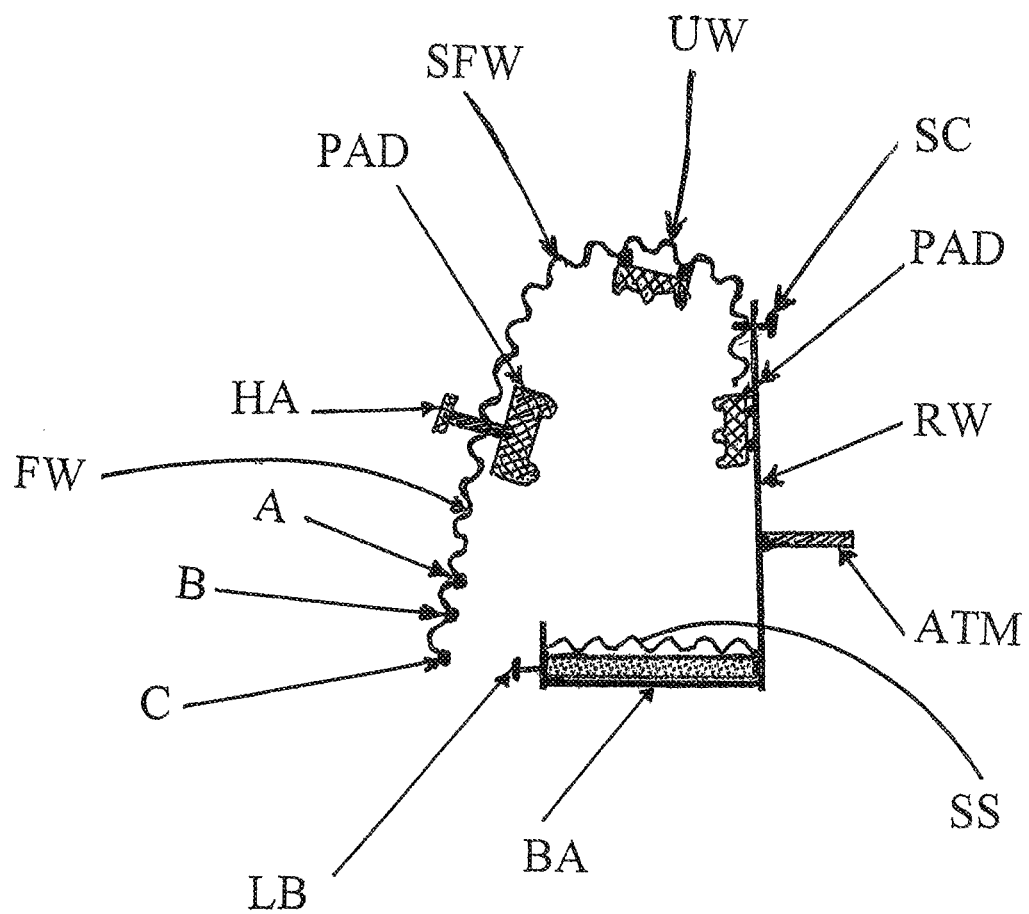
FIG. 29. Shows the side view of a box means which has a sinusoidal, flexible, upper and front walls.
Figure 29A:
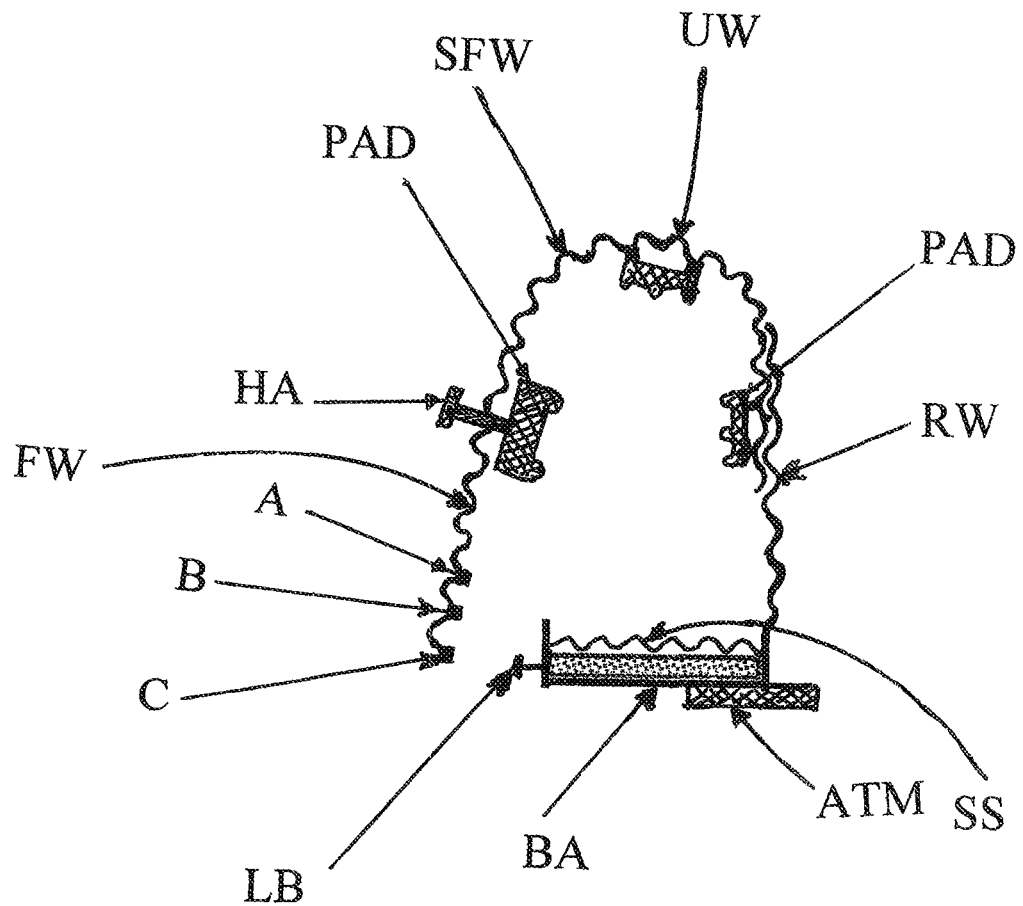
FIG. 29A. Shows the side view of a box means which the front and rear walls are made from two separate pieces of a sinusoidal, flexible material attached to each other.

FIG. 29 A. Shows schematically, the side view a carrier means similar to the model shown in FIG. 29 except the main body of this unit consists of.

A. The rear wall of this unit shown at RW, also is made from a flexible, sinusoidal, sheet which complements the body of the flexible front wall, FW and these two walls have an overlapping zone which allows the size of this overlapping zone to be modified. It can be enlarged to reduce the size of the underlying cargo space or it can be reduced in order to make the cargo space larger. These will be fixed to get it by use of different attachment means such as screws which is not shown in this figure. Note the front wall made of a sinusoidal, flexible sheet and can flex and bend so that the lower end of the front wall, FW can be pulled down and attached to the lock means, LB as it was explained in previous figures this unit also has other pieces and parts which were shown in FIG. 29 as desired.

B. Note in this model the attachment means ATM is also moved to attach to the base of the box means, similar to some other models shown in this application. This design also allows the overall length of the upper wall, UW and the front wall, FW and the rear wall, RW to be modifiable, longer or shorter in order to allow the cargo space to be modified. Importantly also note in some models most of or the whole part of the rear wall RW of the box means may be also made from sturdy, strait steel, to attach to the flexible sinusoidal sheet of material at some point of its surface. Also importantly please note that the flexible walls of this box means do not need to be sinusoidal a shown in FIG. 23-24, and may be made from a flexible steel sheet, or a flexible aluminum sheet or sheets of different metals or manmade materials. Even the of fabrics, canvas, screens, and PVC materials and other materials may be used as desired and was appropriate for the use as explained earlier. Again in the case of materials such as fabrics and canvas they may be enforced with incorporation of metal screens to prevent them from being cut, or they may be modified in different manners as the need comes.

Figure 30:
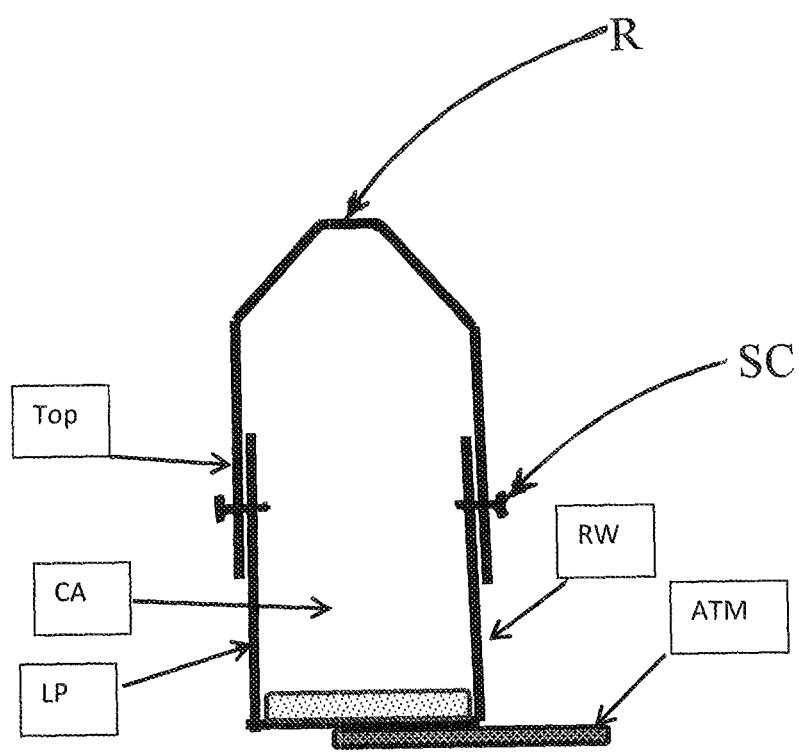
FIG. 30. Shows the side view of a box means which consists of a lower part and a roof shaped upper part.

FIG. 30. Shows schematically the cross cut view of a box means which is also designed to allow their size of the box means to be adjusted. In model the box means consists from a lower part, consisting of with front and rear walls. The front wall is shown at LP and the rear wall is shown at RW. These walls are attached to the base of this unit which is similar to the base of previous models one shown in FIG. 24. This unit has a top part, Top consisting of front, back walls and a roof, R with its side walls. Importantly, the top part of this whole unit has a design which matches the lower part and allows the upper part to be positioned either in a lower position for making a unit with smaller cargo space shown at CA. or be placed in higher position to expand the cargo space allowing a larger incoming unit such as a larger stroller or a wheelchair to fit. Importantly note, the shape of the upper part and ceiling permits the upper portion of the cargo area to be gradually smaller so that the side walls of the upper part to come close to the upper part of the cargo: stroller and almost touch them or their pads. Such proximity by itself will prevent from the incoming units: stroller to be loose and move from front to back with the motion of the car. Also importantly, it will allow this unit to be used with various incoming units: stroller with smaller or larger height when closed. This model will also have other accessories such as pad means and other control means and similar which are shown in previous models and will not be repeated to prevent wasting time. Also the attachment means to the auto is shown at ATM, screw means, SC or other attachment means will allow these parts to be kept secure after being their relative position adjusted.

Modification of the Doors for the Models with Flexible Front and Upper Walls.

Importantly, the applicant has already shown how the ramp-doors can be modified by being made of two pieces which one slides over another in previous application. Now in the case of having the flexible/spring type front and top walls and may even the back walls with the adjustable underlying cargo, the size of the ramp-door and the door opposite to the ramp-door can be modified by use of such adjustable doors so that they will be able to cover the opening of the sides of the flexible/spring top and side walls of this model. Also various modifications of these doors can be done by use of available science in order to seal the edges and underlying space between the flexible walls and their end doors. For example the front and the opposite door means will have side wall designed for going over and overlapping the free edges of the flexible front and the opposite side walls for close the space under them. Importantly, the overlapping sidewalls of the ramp-door means and opposite door over the flexible walls will keep the flexible walls secure and prevent them from moving and being free. Also the ramp-door and opposite door may have inner walls, short walls or protrusions designed to engage with the edges of the flexible walls and prevent them from being pushed inside. The ramp-door and the opposite door will be locked to the flexible walls or to each other by use of proper connection or extension means in order to keep them locked and secured.

THE DETAILED EXPLANATION OF THE INVENTION

The life of humans is easier due to the use of strollers, wheelchairs and different carriers. However, the use of them has its own difficulties, since moving these objects in a vehicle and handling those in and out of the vehicle have their own problems. Commonly they are lifted for placement in the trunk or inside a vehicle, however, due to their weight and a rough shape the manipulation is difficult and labor intensive. In the case of strollers, many mothers do not have enough physical reserve for such expenditure. Also such a physical movement will increase an existing back pain of those who just had C-sections or it may cause a new back and joint pains or worsen the existing ones. These problems are even more pronounced in mothers with small body size or with a compromised physical shape. For solving this problem or at least to trading it with a lesser discomfort this applicant introduced methods and means for allowing such a process to be easy. In this method a box means=carrier means is designed for being attached to the rear of a vehicle to house the units, such as strollers and similar, this carrier means has a door that opens for standing on the ground and functioning as a ramp. This ramp allows a wheeled unit to be held by its handle/s and be wheeled up into the box and be kept inside the box means and to be protected from damages by means that are designed to prevent them from moving. The ramp will close as a door and kept locked. Thus this method will simplify the process of moving a stroller, a wheel chair and similar inside the carrier and will practically eliminate the need for bending and lifting of the stroller means and will help the mothers. The box means will also function as a protector from rain, snow and the hostile environment. Having introduced such unit in past, now the applicant wishes to show some of his ideas for improving his original model for making the use of such units even easier. The new ideas consider the difficulty in directing and advancing the incoming unit such as a stroller/wheelchair into the carrier box means, the incoming units with wheels, and being pushed up in a ramp will have the tendency for moving from side to side and making it difficult for the user to manipulate the unit; stroller and even may fall off from the ramp. Thus the applicant introduces the use of adjustable short walls for being fixed on the ramp's upper surface for making groves or canal type pass ways so that the wheels of an incoming unit; such as a stroller to be directed inside these groves and move forward inside these walls with control. In another model the applicant introduces having a sinusoidal ramp in order to make manufacturing easier. The new application also considers the walls and introduces the use of a sheet of spring for the body of the walls for keeping the units inside the carrier box more secure and prevent them from extra movements, also use of a zone of spring is shown for the attachment means. The original models of these inventions are shown at FIGS. 1-13, and the new models are explained from the FIGS. 14-30. Importantly, all of the ideas introduced in this application the olds and news and figures may be combined for making final models which will be most helpful for the users. The prototype of the first unit is shown at FIG. 1, this figure shows Schematically, the general and the tilted figure of the prototype of the carrier means. This carrier means consists of a rectangular shaped box means with six wall means as follows.

A. A lower wall means which is the base of this unit which has attachment means to attach to the vehicle directly, by use of attachment means, ATM or indirectly by use of the unit shown at FIG. 3.

B. The right wall of this box means has a special design and plays a vital role by acting as a door and a wall. This wall opens along a hinge means, Hinge H1, and moves to stand on the ground as a ramp, Ramp. This wall means has a pole, Pole that functions as a handle and allows the door to be pulled easily and also it stands on the ground for tolerating the weight of the object that will be rolled over the ramp, Ramp and will prevent it from caving in during such as move. Also it may be designed for holding the free end of the ramp, Ramp a short distance above the ground and preventing it from being soiled. A spring means, Spring Means shown at FIG. 2 is placed in a point that will hold this door in closed position and also will keep it in open position when the door is opened.

C. The front wall of this unit has also an important function since it is hinged at Hinge H2 to the base of the unit and it opens to allow the box to be opened either for an access for placement of objects or also to function as a ramp similar to the right wall as mentioned above for wheeling the objects on it. This wall allows the box means to be accessed for adjusting the objects placed in it. It had pad means to prevent the objects from moving, such as pad means which are shown in other figures. The door is shown in closed position in this figure.

D. The left wall of this unit functions as a wall means and it may also have a shape and pad means to prevent the object from moving and shaking during the movement of the vehicle.

E. The top wall of this unit functions as a wall means although it may have a hinge to allow it to open for accessing the box. This wall may also have a shape and pad means to prevent the object from moving.

F. The rear wall of this unit functions as a wall means. This wall may also have a shape and pad means to prevent the object from moving. Importantly, in some models this wall means may be utilized for the attachment of the carrier means to the vehicle.

Importantly, this box may have compartments to allow different things to be placed inside for easy handling.

FIG. 2. Shows the front view of the carrier means. This view shows the carrier with the right side wall in open position, functioning as a ramp, Ramp. The pole, Pole stands on the ground and prevents the free end of the door from touching the ground and being soiled. It prevents from caving of the ramp due to the weight of the object.

A spring means, Spring Means is placed in a point that will hold the door in closed position and also will keep it in open position when the door is opened.

The lower wall of this unit is the base of this unit and it shows the cross cut of an attachment pole, ATM which is like a pole and connects to the wall of a vehicle, commonly in the rear or the vehicle.

FIG. 3. Shows schematically a system of attachment means which allows the box means=the carrier means to be connected to the vehicle, and to be tilted and rotated when needed. This system has.

a. A base means, Base that allows the bottom/lower surface of the box means shown at FIG. 1-2 to be placed and attached to it. A horizontal hinge means, b. It has an attachment means, ATM which is like a pole and is designed to engaged and be connected to the body of the vehicle by a commonly used methods such as the connection means for pulling the boats.

c. A horizontal hinge means, Hinge Means 1 with a lock means, Lock Means 1. This hinge means allows the base which will have the box means on it, to be tilted on a horizontal axis. So that the rear part of the vehicle can be accessed. The lock means will keep this hinge means in a locked position. The lock means will be made from various known means so that when the lock means gets engaged the hinge means will stay in a locked condition and will not move.

d. A vertical hinge means, Hinge Means 2 with a lock means, Lock Means 2. This hinge means allows the base which will have the box means on it, to be rotated on a vertical axis. So that it will open similar to a door, to allow the rear part of the vehicle to be accessed. The lock means will keep this hinge means in a locked position. Also importantly, the lock means, Lock Means 1 and Lock Means 2 are designed to lock these hinges so that only one of hinges will be functional at a time. Also to lock both of them when desired such as during the period which the vehicle is moving.

e. Also the system has a stop means, Stop Means, which is designed to be used from moving the box means to an unwanted position such as tilting more than 90 degree or a predesigned level. In this model the stop means will come to stop at the body of the vehicle and prevent further movement of the box. Many other models of such a stop means may be used.

The base, Base has the attachment means, ATM which is like a pole and connects to the rear of a vehicle, to a commonly used attachment means in the rear of the vehicle, commonly used for pulling the trailers etc.

Please note this extra space could not be removed after many attempts. Importantly, the attachment pole may consist of two or more parts to allow one piece to be attached to the vehicle on permanent basis and the second part to be attached to the carrier and these two pieces to be attached to each other on a detachable re-attachable basis. FIG. 4. Shows another view of the carrier means in order to specify some of the important parts. This figure shows the front door, Front Door in open position indicating that it can function as a ramp. This door has a lock means, Lock, which allows the door to be kept in a close position. Also this figure shows a grid means, Grid that consists of two pieces one in the right and the other one in the left, designed to be pulled and hold the object inside the carrier means in a stable position. These grid means have retainers, Retainer that allows the grid means to be pulled and hold in a fixed position. The grid may be made from a flexible material such as a net or any other materials, such as fabrics depending the case. The function of the grid is to be pulled toward the rear wall in order to hold the object inside the box in a tight and secure position and prevent it from free movements. Initially the grid means will be posed away from the object to allow an open space for the placement of the object, however after the placement of the object the grid means will be pulled toward the rear wall of the carrier means by use of the retainer, Retainer in order to keep the object tightly. The function of the grid means is important since it prevents the damages to the object, otherwise the object will be loose inside the box while the vehicle is moving. The grid may be removed if desired. Importantly, the shape, size and various important specifics of this piece will be changed to match the need. Also importantly, this figure shows a series of the pads means, PAD located on the inside surface of the front door. These pad means are designed to match the shape and makeup of the objects so that the closure of the door will press the pad means against the object and prevent from the movement of the object and damages. These pads may be made.

1. To be pre-shaped, such as shaped foams.
2. To be positioned in different places or chosen differently, such as having an attachment means such as hook and loop fastener so that their position, sizes or their selections to be changed easily.
3. They may be made from inflatable balloons or pads. So that initially the unit is flat or away from the object to allow the object to be placed then the balloon to be inflated to be functional and to hold the object tight in the proper position.
4. They may be made from adjustable pads. So that initially the pad is kept away from the object to allow the object to be placed inside the box then after the object is in place, the pad will be pushed forward by various means such as handles etc. In order to be pushed to act and hold the object tight in the proper position. In example shown in this figure the pad means, Pad is away from the object when the front wall is open, but with the closure of the door the pad means will force the object toward the rear wall and keep it stable.
5. Any restraint means which can be used for keeping the objects in place securely.
6. Combinations of various means for protection and holding the object position.
7. Importantly, the unit may have restraints that will be placed when the object is in place and the front door is open and then after the object is properly restrained the front door will be closed to further keep the object in stable position with use of its pad means etc.
8. The unit may have means such as snaps and screws in order to allow a pad means or a spring means or a restraint means to be pushed or screwed in order to make a compression against the object for holding it in the position.

Importantly, the use of these pads, balloons or the restraint means are not limited to the front door, or nay parts since these means may be also placed in other areas such as the back wall the top wall etc. In order to make the box means more hospitable and safe for the object being placed.

This figure also shows a handle, R-Hand that has two ends and one end is attached to the ramp by a hinge means and the other end is removably attached to the body of the carrier by a detachable, re-attachable means such as a hook and loop fastener. The detachable end of this unit allows the user to hold it and pull up the ramp without the need for bending. This will prevent from back discomfort. After the closure the free end of the R-Hand will be attached to the body of the carrier by another detachable, re-attachable means such as a hook and loop fastener. This handle may have an adjustable body to allow it to be longer or shorter.

FIG. 5. Shows specifically a box means, Box Means that is placed on a system of attachment means shown at FIG. 3. In this figure the position of the hinge means, Hinge Means 1 is shown, located in the base of the unit. This hinge means allows the whole unit, (the base and the box=carrier means) to be tilted forward in order to allow the rear of the car such as the trunk to be accessed. Also the position of the hinge means, Hinge Means 2 is shown located, in the vertical edge of the box means, Box Means. This hinge means allows the box means to be rotated from the rear of the vehicle, to the right side of the vehicle, so that the rear of the vehicle, such as the rear door to be accessed.

Please note that if the box means is attached to the rear door of a vehicle, then the use of the hinge means will not be needed and they can be eliminated from these units.

Importantly, the FIG. 5 also shows handle means on the front wall that attaches to a pad means inside the box means by a screw. So that by rotation of this screw means the pad means will move forward inside the box means to compress the object for holding it in the position. The rotation of these screw means in the other direction will move the pad means away from the objects.

Other means such as snaps means or handles may be also used in order to allow a pad means, a spring means or a restraint means etc., to be pushed forward for the compression against the object for holding it in the position. Other means may be used as well.

FIG. 6: Shows schematically a ramp means that consist from combination of two pieces which one of them slides over the other. In this figure the ramp, Ramp A has borders, shown as Border Wall A1 and A2 which allow the ramp, Ramp B to slide into it. This method is for allowing the length of the ramp means to be adjusted. In another method the ramp may have two pieces which folds over another.

FIG. 7. Shows schematically a cradle means, which is designed to be placed on the floor of the box means, so that it will function in keeping the objects inside more securely. This unit for example is designed to allow a wheel chair to be wheels on it and it will accept the wheels of the wheel chair and will prevent them from moving. The place for the smaller front wheels and the place for the large wheels are shown.

FIG. 8. Shows schematically a modified version of a carrier means shown at FIG. 1 which is equipped with wheels so that it allows the weight of the box means to be tolerated and transmitted to the street.

The unit may have more than one set of wheels. Also this model shows a version which an electrical method is utilized in order to open and close the door, Ramp automatically. This will eliminate the manual work for opening and closing of the ramp and is more useful when the door is heavy or the user prefers not to open or close the door by hand. The prototype of this unit is made by having a C shaped piece, C-Rot which has the engagement means, such as teeth on it and comes in contact with the teeth of the matching wheel, E-Rot from an electrical motor. So that the rotation of E-Rot will rotate the C-Rot and since the C-Rot is attached to the door means, Ramp, thus it will open or close the Ramp by use of the electrical engine means. This unit may be further intensified by use of a remote controller, Rem-Control of the electrical motor which allows the ramp to be opened and closed. This carrier means will simplify the use of this unit and will be beneficial in cases which further simplification is needed. This model will be more useful for the movement of units such as electrical scooters etc. This figure also shows the light means, light that would be connected to the signal lights of the vehicle. Also has place for a license plate, License.

FIG. 9. Shows schematically an adaptor means which allows the existing attachment means of a vehicle in the rear such as place for holding the spare tire to be modified for allowing the attachment of the box means to the rear of a carrier means shown at FIG. 1. In this figure an upper plate, UP-Plate has holes, Hole which matches the location of holes from the site for mounting the spare tire. This allows this plate to be placed and screwed into the place for the spare tire. This plate means has a curved or angled area, Bent which provides a vertical distance between the first and second plate. Then the continuation of the first plate makes the lower plate, Low-Plate which is equipped with a set of screws, Screw, designed to allow the rear wall of the box means to be placed and screwed to this plate in order to be secured. This modification will allow the height of the box means to be adjusted in order to allow the ramp to be in a proper position to allow it to be easily placed on the ground for use. Importantly, the shape of this unit may be modified with various bends and shapes in order to allow it to be useful in different models of vehicle, and various positions of the attachment means. In the cases which the tire mounts to the bottom of the vehicles this unit may have a rectangular bent.

FIG. 9A. Shows schematically the side view of the adaptor means shown in previous FIG. 9. In this figure the upper plate, UP-Plate the angled area, Bent and the another plate, Low-Plate are shown. Again importantly, the angled area, Bent will have different sizes.

FIG. 10. Shows a unit similar to the version of a carrier shown at FIG. 8 except this door of this unit consists from two pieces that allows one piece, Ramp 2 to be placed on the ground to facilitate the movement of the scooter to the carrier and prevent from unwanted movement of the ramp. This provides a steady unit. After use, the Ramp 2 will fold on Ramp 1 and close. The surfaces of these ramps are covered with materials to prevent slipping of the scooter. The hinge, Hinge, is also marked.

FIG. 11. Shows schematically a method of making an electrical scooter to be placed inside a carrier means and be kept in proper position inside without hitting the opposite wall, without control to damage. This figure shows the front view of a unit consisting of various part such as a board, Board which holds two electrically conduction spring plates shown at Plate A and Plate B. These plates are electrically conductive and connected to the electrical cables, Cable A and Cable B and are in contact electrically at point Contact. Per design the plate, Plate A will separate from Plate B to disconnect the electrical system when the piece, Horn is pressed, thus it will disconnect the electrical current coming from Cable A to the Cable B. The unit has also a switch, PA-Switch which is shown at FIG. 12. This unit will be attached to the front bumper of the electrical scooter and the main cable from the electrical system of the scooter will be cut and electrically connected to the free end of Cable A after via PA-Switch. The other end of this cable will be attached to the Cable B and to the electrical motor, E-M of the scooter. The method of use is explained in more details at fi FIG. 12. Shows schematically the top view the unit shown at previous figure and gives the position of various parts. This figure also shows a parking switch, PA-Switch that is designed for use during the process of parking. So that when the electrical scooter is being placed inside a carrier this switch will be turned on to make the parking system functional. In this figure a cable coming from the scooters battery, Battery attaches to this switch. Originally this switch will connect the battery to a cable that is attached to the electrical Motor of the scooter, E-M and this makes the electrical circuit complete and functional. When the unit is being moved into the carrier to be parked inside it the parking switch, PA-Switch will be turned to the parking mode to connect the battery, Battery to the Cable A. Thus the electrical current will go through the system shown in this picture and finally reach the electrical motor of the scooter, E-M via the cable, Cable B. Then the scooter will be driven up into the carrier box means and the horn, Horn will come in contact with the left wall of the carrier and force of contact will press the horn, Horn and it will separate the plate, Plate A from the Plate B to disconnect the electrical system. The disconnection will stop the E-M and the movement of the scooter will stop. Spring means and similar things will be added to this system to allow a predicted and controlled contact of the horn, Horn with the left wall to prevent damage. When the rider wants to remove the scooter will turn the switch to the riding mode and the unit will be functional till next parking time comes.

FIG. 13. Shows schematically the front view a box means that has a compartment for the placement of things such as bags or similar things. This part is to facilitate the placement of things which the user may carry. This compartment may be more than one and its shape, size and place inside the box means may vary.

The following part of the application will explain the new ideas which are added to the original application. And they consider the problem of moving a wheeled object up on the ramp and the use of Canal type passes are introduced, also a ramp which has sinusoidal upper part is introduced. The applicant also considers using a continuous, flexible upper and front wall so that the front wall and the upper wall can be opened and the inside the box means can be accessed for various reasons such as fixation of the unit inside or placement of objects within the box means and similar. The flexible upper and front walls will allow pulling these walls down and locking them tight for securing the unit inside.

FIGS. 14 and 16. shows schematically the cross cut; FIG. 14 and top view, FIG. 16 of a L-shaped long (about 40-60 inches long) metal piece, that consist of two rectangular pieces (of about 40-60 inches long and 3-5 inches wide sheets of metal) which have joined together to make this L shaped unit. The first rectangular piece is a horizontal, long, flat sheet, shown at HZS-A and the second rectangular piece makes a vertical wall, shown at VW-A The horizontal, flat rectangular sheet, HZS-A has holes, such as HO-A1 and HO-A2 which allow screws to go through for being fixed on the surface of a ramp shown at FIG. 18. Note the ramp shown in FIG. 18 has two slits, shown at, SLT-1 and SLT-2, designed for allowing screws to go through the horizontal part of the L-shaped pieces and with the use of nuts to fix the L-shaped units on the surface of the ramp securely. A sister unit of this first L-shaped unit is shown on FIGS. 15 and 17 which are a mirror image of the unit shown on FIGS. 14 and 16. The fixation of these two sister pieces on the surface of the ramp shown at FIG. 18, will create a mini canal shaped passage shown at FIGS. 19 and 20, at PASS-A and PASS-B. Designed to accept the wheels of the incoming carrier units.

Importantly, these L-shaped pieces may be also placed on the upper surface of the floor of the box means so that the wheels of the carrier or similar unit can move into the box and sit on top of these L-shaped units. In such models the L-shaped units may have a cushion means for being located in the space between the top of the floor and lower surface of the L-Shaped units for functioning as a cushion or a spring means. This design is for absorbing the vibrations and movements of the carrier when it is sitting and being moved inside this box means. Thus the system with cushion means is particularly designed to be used inside the box means when the carrier means is sitting inside these units. These cushion means will prevent from the extra up and down movements of the carrier means inside this box means when the automobile is moving. Importantly please note even though L-shaped units are introduced in these figures and the application, however, the main idea is having vertical walls or walls or barriers of any form on the upper surface of the ramp, thus this may be even done by use of other means such as only vertical wall with having shaped tongues going through a properly sized slots on the ramp to keep them in vertical position or having screws in the lower surface of the vertical walls for fixing them on the ramp in vertical position or even welding the walls on the ramp or use of other fixing means which may be used for achieving this purpose. Also note that that in some cases only one vertical wall may be used for directing the incoming units: Stroller to follow the dissection so that this goal may be achieved with use of a minimum of one wall.

FIGS. 16 and 17 are designed for being fixed on the surface of the ramp shown at FIG. 18. By fixing two L-shaped pieces, such as LS-A and LS-B shown at FIGS. 16 and 17 it will create the canal type pass as mentioned before at FIGS. 14 and 16 and a parallel unit shown at pass-A and PASS-B and PASS-B at FIG. 19 which allows the wheels of the incoming unit to be guided inside these canals and FIG. 19. Shows schematically a modified ramp shown at FIG. 18 which has four L shaped means shown at FIGS. 14 to 17 secured on its surface for creating the passes explained earlier for facilitating the entrance of the upcoming wheeled units and their movement inside the carrier means shown at shown at FIG. 21. So that they have created the two parallel passes PASS-A and PASS-B. Note the lower end of the vertical walls of the L-shaped units has an angled small wall such as GW-A and GW-B designed to function as an initial wider opening for facilitating the entrance of the wheels of the incoming carriers into the passes. Note, the horizontal metal sheets, HZS-A and HZS-B of the L-shaped units will be secured on the surface of the ramp, RAMP as shown in FIG. 19 by use of the screws such as screw, SCW-A shown better at FIG. 20 going throw the holes, HO-A1, HO-A2, and HO-B1 and HO-B2 as well as through the slits SLT-1 and SLT-2 from the body of the ramp, shown in the FIGS. 16, 17, 19 and 20 for creating the unit shown at FIGS. 19 and 20. Importantly, note that this method allows the position of the of the L-shaped pieces on the ramp, RAMP to be adjusted, so that the distance between the vertical walls, VW-A and VW-B, VW-C and VW-D can be easily adjusted independently, for allowing different sized wheels as well as wheels which have different distances from their counterpart to be used in these ramps. This is one very important method and means of these new units presented in this application. Note importantly, by this method.

A. The distance between the vertical walls, VW-A and VW-B can be adjusted independently from others.

B. The distance between the vertical walls, VW-B and VW-C can be adjusted independently from the others.

C. also the distance between the vertical walls, VW-C and the VW-D can be adjusted independently from the others too.

Thus this method allows the carriers with different width of the wheels also with different spaces between their wheels from each other to be easily pushed by using this ramp when the initial adjustment and placement of the L-shaped walls is done on the ramp to match those. In other words this allows the creation of a universal type of the ramp, which can be used with different carrier means with different sized wheels and distances when closed. Importantly, in some cases, the ramp may have more than two passes in order to accommodate unusual incoming units.

FIG. 20. Shows schematically the side view of the ramp shown at FIG. 19. The purpose of this figure is to show how the L-shaped units are attached and fixed on the top surface of the ramp for making the passes.

FIG. 21. Shows schematically the front view of a box shaped carrier means which consists of a box means similar to the unit shown as main model. In this view the box appears like a rectangle with curved edges. This box means is designed with having multiple doors, such as A. The first door is shown schematically in the right side of this figure and is shown at ramp, RMP.

B. A second door which is located in the opposite wall of the carrier box compared to the ramp, here shown at DOR-B.

C. The third door which is located in the front wall of this box means and here is shown at door, DOR-F D. The box may have one or more other doors, if needed, for the purpose of allowing entrance. To allow access to the inside of the box means for adjustment and securing of the units, placement of objects and other intentions. Please note:

1. The first door in the side of this unit functions as the ramp, RMP. And it is altered and designed in order to function as a ramp, it is hinged to the body of the box by hinge, HI-R., so that it can be opened to function as a ramp and closed to function as a wall of this box means. This side wall has a lock means LOC-R. Which allows it to be locked to the box means, box means when it is closed. A modified version of this ramp is shown in FIGS. 19 and 20.

2. A second door, located in the opposite wall of the carrier means, here shown on the left side at DOR-B. is also a side door and side wall which is also hinged to the body of the box means at hinge, HI-B so that this wall, also can be opened for allowing access to the inside of the carrier box means. This wall, DOR-B has numbers of pad means, PAD, designed to engage with the body of the incoming unit such as a stroller for the purpose of holding them inside the carrier box in a controlled position and preventing it from jiggling and unwanted movements inside the carrier box means. Two of such pads are shown PAD1 and PAD2 as examples of these pad means. Importantly, the pad means PAD are attached to the surface of the door, DOR-B on a detachable re-attachable basis, shown at DT-ATM so, that the pad means can be adjusted and repositioned or exchanged. This detachable-attachment means may be made from different means such as snapping means, screw means, magnet means, Velcro™ and similar so that it allows these pad means to be adjusted, re-positioned, exchanged or a new pad means or unit with different size and shape and function to be attached to door means, DOR-B. for functioning for the purpose which is designed.

3. A third door shown on the front of the box at DOR-F is also hinged to the body of the box by hinge, HI-F. This front door can be opened and closed for allowing the access to the inside of the box means to occur and it will be locked to the body of the box by use of lock, LOC-F. The opening of the door F allows access inside the box means for various reasons such as the manipulation of the means inside the box, for securing the carrier unit, placement of materials or any other purposes. This door also will allow different latches or a restraint means, pads and interventions means of any kinds to be used for securing the position of the incoming unit inside the box. These means, in general are designed to prevent from the object inside this box from jingling, vibration and extra movements. The inner surface of the wall of this door may have means such as pads, shown at PAD or grabbing means attached to it on a permanent or detachable, re-attachable basis. These pad means, PAD may also be a grabbing means, a fixation means and similar also designed for participation in securing and handling of the carrier means inside the box. Also this door allows placement and removal of other objects inside the box means. Furthermore the box means may have other sorts of securing means such as a latch means, LATCH shown in the upper right corner of this figure, which in this case consists of a fork shaped body (cannot be recognized in this figure) and is hold by a magnet, MAG on the top wall of the box. The first end of this latch, LATCH is hinged to the upper body box by use of the hinge, LCH-HI. This method and means allows the release of this latch means after the incoming unit is placed inside the box so that the right and left probes of this latch means will engage on the sides of the carrier means and prevent it from jiggling and extra movements. Importantly, also means such as vise means, VISE may be used with its control means or a handle which extends outside of the box means so that the vise means can be engaged and be functional by rotating its handle, VISE-HA around the hinge of the vise, VISE-HI so that by clock wise rotation of the handle will cause movements the paws of the vise means toward the sides of the object inside for holding it tight. Conversely, the contra-clockwise rotation of the handle of the vise will disengage and move away the paws from the object inside and allows it to be free. The first door, which functions as a ramp, Ramp, may have the canal shaped modifications shown in FIGS. 19 and 21. For creating the parallel pass means shown at PASS-A and PASS-B so that the wheels of the incoming unit to be guided inside these pass and be directed easily inside the carrier box without allowing the wheels to sway away from the proper direction. The push means shown at PUSH is designed to rotate and engage with the will allow it to be rotated so that by clock wise rotation of the PUSH will movements its screw body forward and towards the side of the object inside for holding it tight. Conversely, the contra-clockwise rotation of the screw means PUSH will move the end of the push away from the object inside and allows it to be free FIG. 22. Shows schematically, a carrier means similar to the main model explained in the main text which is attached to the rear end of an automobile shown schematically in the right side by the connection means which consists of.

A. a rigid attachment means shown at, Rig-ATM, which is not flexible, and is made from steel.

B. A flexible and spring type piece, SPRI-A which attaches to the box means, BOX-MEA and also to the rigid attachment means Rig-ATM. This piece of spring means allows the box means the BOX-MEA to move up and down with some hesitancy compared to the rigid piece and this mechanism gives the advantage of preventing the box means to be traumatized. This figure also shows the door which functions as the ramp shown at the RP-DR which is hinged to the body of the box, BOX-MEA by the hinge means HIN. The front wall of this box means is shown at the FR-WL.

Units with Adjustable Cargo Spaces.

The new application also introduces methods and models of new carrier means which allows the space of the cargo area to be modified in a given model. This is very important issue since there are different sizes of the strollers and the wheelchairs and similar. Although there is no such a thing as one size fits all in these units, however, the following methods and means are being introduced since they provide a reasonable options of adjusting the size of some models of these units and the will allow the box means to be enlarged or minimized to a given degree and be more ideal. The units introduced here have options with many advantageous for example:

A. They allow the overall size of the carrier means to be reduced for cases which the incoming units are small. Therefore, the box means will be smaller and will not occupy much of space in the rear of the car in the proximity of the trunk, therefore, they may not need to be tilted or moved away from the rear of the car for accessing the trunk of the car. Thus the use of hinges may not be needed for these models. This will simplify the unit significantly since the use of vertical and horizontal hinges will be eliminated.

B. This method also allows the size of the box means to be adjusted for choosing larger sizes for larger incoming units, and the smaller one for the smaller units.

C. This method allows the in any given smaller or larger units the size of the cargo area to be modified, to be the most optimal as needed. This option has the advantage of choosing the size of the cargo area which is not larger than is needed. Therefore the incoming unit or the unit inside the cargo area will not have extra space to move, jiggle and be damaged.

D. Importantly, the adjustment of the size of these models can be done in the beginning when the user is mounting these units and adjusting the sizes. Alternatively, in later time they can decide to modify the size.

Such new models with adjustable sizes are shown in the FIGS. 23 through 30. The model shown at FIG. 23 shows a model which has flexible upper and front walls. The flexibility of these walls allows the end of the front wall to be pulled down and fixed in the first locking position A to make it the cargo space smaller, or he/she can choose the locking position C for making a larger cargo space and it also allows a spectrum of the sizes to be chosen. Please note the FIG. 23.

FIG. 23. Schematically shows another feature of this new invention which consists of the following. First. The rear, wall, the upper wall and the front walls of this unit are made of a flexible, spring type sheet means which has a series of pad means, PAD-M designed to engage with the incoming unit such as a stroller and to keep them inside the box securely. The flexibility of these walls allows the front wall of this unit shown at FR-WL, which can be:

A. closed by engagement of the locking means shown at LOC-MEA from the base of the box means and the front wall, FR-WL of this box means for tightening of the box means and keeping the unit stroller inside safe. Importantly, the engagement of the front wall, FR-WL, with the lock means, LOC-MEA may be chosen to happen in different zones, such as, A, B and C. from the front wall FR-WL. This method allows the proper size of cargo space to be chosen to prevent from a loose unit inside the box means. Thus, after the placement of the unit: stroller inside the box means the front wall, FR-WL will be pulled down to squeeze the space under the wall and to touch hard the incoming unit, stroller and then to engage with the lock means LOC-MEA with use of proper zone, A, B or C for keeping the unit inside securely. This figure also shows some other specifics of this new version which consists of a cushion—spring means shown at CS-SM which consist of a cushion means designed to absorb the motions of the unit inside the box. Also the CS-SM unit may have an upper surface designed to function as a cradle as shown in FIG. 7 and keep the incoming carrier means inside and prevent it from moving forward or side-by-side. A lock means shown at LOC-MEA will allow the locking of the front walls to the body of the box means by various locking means. Note the attachment of the lock means, LOC-MEA to the body of the box means can be chosen to be adjustable and be placed either higher or lower on the base than the spot shown so that by using the flexible wall means the space under this wall means can be smaller or larger.

This figure also shows a ramp means, RAM-WI which consists of a sheet means with an upper surface made of a zigzag or sinusoidal type of body as shown in FIG. 24. At SS. The advantage of zigzag or sinusoidal design is that it will allow the wheels of the incoming unit, stroller to randomly fall inside the space between the raised walls of this zigzag/sinusoidal shape ramp or side of its walls and to negotiate for being moved into the box means with ease. It should be considered that commonly the present strollers make ups allows their wheels to move close to each other or away from each other to a certain degree when they are folded therefore in practice such a negotiation may be possible.

FIG. 24. Shows schematically, the side view a carrier means similar to the model shown in FIG. 23 except with new items and options. This unit also consists of.

A. A relatively rigid rear wall shown at RW, which is vertically positioned and attaches to the base and has similar attachment means ATM which allows the whole unit to be attached to the rear of an auto. The upper segment of the rear wall, RW adjustably attaches to a flexible upper wall FW1.

B. The flexible wall FW1 is made from a flexible sheet which by itself then connects to another flexible sheet which is designed to make a flexible front wall, FW2. Importantly, this design allows the zone of connection of the flexible wall FW1 to adjustably attach to the rear wall. So that the area of overlapping the FW1 and the rear wall, RW can change. It can be small or a large zone. Also from the other side of the attachment of the FW1 to the front wall FW2 is adjustable as well, this adjustability also allows the zone of connection of these two parts of walls to be larger or smaller. A properly designed openings with use of the proper screws means, SC allows the attachment of the flexible sheet FW1 to the rear wall, RW and also to the front wall FW2 to be stable. The predesigned flexible sheet allows these walls to flex, bend and be pulled so that the lower end of the front wall, FW2 can be pulled down and attached to the lock means, LOC-MEN from the base of this carrier means unit shown and explained at FIG. 23. Thus importantly, this method allows the volume of the cargo space under this wall to be modified by deciding the area of the overlapping of the wall FW1 and FW2. For example if this overlapping area is chosen to be large the cargo space will be small. In contrast if the overlapping area of FW1 and FW2 is chosen to be minimal the cargo space will be largest the same mechanism also applies to the attachment of the flexible wall FWland the rear wall RW. Importantly, note in some models most of or the whole part of the rear wall RW of this box means may be also made from the same type of flexible sheet material. Also importantly please note that the flexible walls of this box means may be chosen to be sinusoidal as shown in FIG. 28. Note in FIGS. 23 and 24 the flexible sheet may be made from steel, aluminum or sheets of different metals or man-made materials. Importantly, in some models fabrics, canvas, screens, or PVC materials may be used for the walls when desired and appropriate for the use. In the case of materials such as fabrics and canvas they may be enforced with incorporation of metal screens to their wall for preventing them from being cut, or they may be modified in different manners as the need comes. Thus, the walls of the box means in the unit shown at FIGS. 23 and 24 may be made from:

I. Canvas or similar type of fabrics, or fabrics of any type.
II. Sheets made of PVCs and other man-made materials.
III. Screens made of metals, PVCs and other materials.
IV. Sheets of steel or other metals.
V. Sinusoidal shaped sheets of material.
VI. Combination of these materials.
VII. Any other type of materials that can be made and used for this purpose.

Importantly, the various options and means explained here may be used in other units shown at FIGS. 23 and 28 and others if apply. Please note these options are shown in FIG. 28 in details. The inner surface of the walls has a series of pad means, PAD shown in FIG. 23-28, designed for engagement with the incoming unit; stroller and prevent it from the extra movements and jiggling inside the box means. For the details of these options please note the FIGS. 23 and 28. So that similar options will not be repeated.

Modification of the Ramps and Doors for Fitting the Box Means with Flexible Front and Upper Walls.

Importantly, the applicant has already shown how the ramp-doors can be modified by being made of two pieces which one slides over another in previous application. Now in the case of having the flexible/spring type front and top walls and may even the back walls with the adjustable underlying cargo, the size of the ramp-door and the door opposite to the ramp-door can be modified by use of such adjustable doors so that they will be able to cover the opening of the sides of the flexible/spring top and side walls of this model. Also various modifications of these doors can be done by use of available science in order to seal the edges and underlying space between the flexible walls and their end doors. For example the front and the opposite door means will have side wall designed for going over and overlapping the free edges of the flexible front and the opposite side walls for close the space under them. Importantly, the overlapping the sidewalls of the ramp-door means and opposite door over the flexible walls will keep the flexible walls secure and prevent them from moving and being free. Also the ramp-door and opposite door may have inner walls, short walls or protrusions designed to engage with the edges of the flexible walls and prevent them from being pushed inside. The ramp-door and the opposite door will be locked to the flexible walls or to each other by use of proper connection or extension means in order to keep them locked and secured.

Units with Adjustable Cargo Spaces.

The new application also introduces methods and models of new carrier means which allows the space of the cargo area to be modified in a given model. This option has many advantageous for example:

A. it allows the overall size of the carrier means to be reduced for cases which the incoming units is small. Therefore, the box means will be smaller and will not occupy much of space in the rear of the car in the attachment area and will not need to be tilted or moved away from the rear of the car for allowing access to the trunk of the car. Therefore the use of hinges may not be needed for these models. This will simplify the unit significantly since the use of vertical and horizontal hinges will be eliminated.

B. This method also allows the size of the unit to be adjusted for choosing larger sizes for larger incoming units.

C. This method allows the in any given smaller or larger units the size of the cargo area to be modified, chosen to be the most optimal needed. This option has the advantage of choosing the size of the cargo area which is not larger than is needed. Therefore the incoming unit or the unit inside the cargo area will not have extra space to move and jiggle and be damaged.

D. Importantly, the adjustment of the size of these models can be done in the beginning when the user is mounting these units and adjusting the sizes. Alternatively, in later time they can decide to modify the size.

Such new models with adjustable sizes are shown in the FIGS. 23 through 28. The model shown at FIG. 23 shows a model which has flexible upper and front walls. The flexibility of these walls allows the end of the front wall to be pulled down and fixed in the first locking position A to make it the cargo space smaller, or he/she can choose the locking position C for making a larger cargo space and it also allows a spectrum of the sizes to be chosen.

FIG. 25. Shows schematically the rear view/lower view of a ramp-door means which consists of two pieces P1 and P2 which overlap each other. This design allows the size of this door which functions as a ramp to be adjusted. In this figure one piece of this door is shown at P1 and is located in the lower side and by use of screws one of them shown at DS to the second piece shown at P2. The piece P2 has its own curved shape in the top in order to fit the curved shape of a flexible top wall of the box means shown on FIG. 24. This door has protrusions shown at PR in the side of the top wall P2. The function of these protrusions is for getting engaged with the flexible front wall and to keeps its edge between the edge of the ramp-door and these protrusions and prevents it from being pushed in.

FIG. 26. Shows schematically the cross cut side view of the unit shown at FIG. 25. In this figure a lower piece P1 is shown which stands adjacent to the upper piece P2 and by doing so it allows the size of the door to be adjusted and be longer or shorter. The upper end of the piece P2, has an angled edge shown at ED which this edge will go over the front door and keep it under itself. A cushion means is shown at CU and is designed to be pressed against the edge of the flexible wall and seal the space in between. Please note that the relative sizes of these two door pieces and their position will be engineered in order to allow one piece to slide over the other easily and make it functional unit. Also one of these doors will have a slit piece will allow the position the screw to be chosen.

FIG. 27. Shows schematically the front view of a ramp-door means which is similar to the door means shown in FIG. 25 except this door means has four door pieces which overlap each other. The two pieces of P1, P2 are shown and the have a mirror image counterparts which will attach and overlap each other longitudinally at overlap line OL. This design allows the overall size of this door means which functions as a ramp to be adjusted. Screws such as one of them shown at DS will be used to hold them together.

FIG. 28. Shows schematically the cross cut side view of the unit shown at FIG. 27. And shows two L-shaped pieces, FB-A and FB-B which are overlapping each other and are fixed by the screw SC. Thus by moving these sheets from each other the ramp-door will be wider and by moving them close to each other the ramp-door will be narrower. Side walls one shown at SW will overlap the side of the front and back walls and keep them in control. The sidewalls also will function to prevent the wheels of the incoming unit from falling off. Please note again that the relative sizes of these two door pieces and their position will be engineered in order to allow one piece to slide over the other easily and make it functional unit. Also one of these doors will have a slit piece will allow the position the screw to be chosen. Please note that importantly the door opposite to the ramp-door also may have almost similar p FIG. 29. Shows schematically, the side view a carrier means similar to the model shown in FIGS. 23 and 24 except the main body of this unit consists of.

A. A relatively rigid rear wall shown at RW, which is vertically positioned and attaches to the base and has an attachment means ATM which allows the whole unit to be attached to the rear of an auto. Importantly note that the point of attachment of ATM is shown to be higher in this model so that the cargo area can be lower, thus it will not obstruct the access to the trunk of the car. The importance of this issue is that it will eliminate the use of horizontal and vertical hinges designed to move the carrier box verticality and horizontally as shown in FIG. 5. The rear wall continues to attach to the extension of their flexible upper wall, UW and a flexible front walls, FW which importantly, is made of a sinusoidal, flexible sheet which also allows this wall to flex and bend so that the lower end of the front wall, FW can be pulled down and attached to the lock means, LB from the base of this carrier means unit shown at BA. Importantly, this method also allows the volume of the cargo space under this wall to be modified. Importantly, note that there is a zone of overlapping of the zone of an attachment of the extension of the upper wall, UW to the rear wall, RW. This design allows the length of the upper wall, UW and the front wall, FW added to the rear wall, RW to be modifiable, longer or shorter in order to allow the cargo space to be modified. Importantly also note in some models most of or the whole part of the rear wall RW of the box means may be also made from the same type of flexible sinusoidal sheet of material. Also importantly please note that the flexible walls of this box means do not need to be sinusoidal a shown in FIG. 23-24, and may be made from a flexible steel sheet, or a flexible aluminum sheet or sheets of different metals or manmade materials. Even the of fabrics, canvas, screens, and PVC materials and other materials may be use as desired and was appropriate for the use. Again in the case of materials such as fabrics and canvas they may be enforced with incorporation of metal screens to prevent them from being cut, or they may be modified in different manners as the need comes. Thus, the walls of the box means may be made from:

I. Canvas or similar type of fabrics, or fabrics of any type.
    II. Sheets made of PVCs and other man-made materials.
    III. Screens made of metals, PVCs and other materials.
    IV. Sheets of steel or other metals.
    V. Sinusoidal type of material.
    VI. Combination of these materials.
    VII. Any other type of materials that can be made and used for this purpose.

B. The inner surface of this wall has a series of pad means, PAD designed for engagement with the incoming unit; stroller and prevent it from the extra movements and jiggling inside the box means. Importantly, some of these pad means shown in the left side of this figure may have screw means attached to a handle shown at HA so that by rotating the handle the pad will move forward to be pushed to touch the incoming unit and keep it still and by rotating in the other direction it will move away from the inside unit. Note the body of this flexible wall makes the upper wall, UW and also the front wall FW as well. The flexibility of these walls allows the front wall, FW, to be pulled down and lock to the base of the box means at lock LB in different points, shown at A, B, and C. The engagement of lock, LB with the front wall at point C will make a larger Cargo Space and the point A will make a smaller cargo space and point B will be in between. Also again the point which the end of upper wall, UW attaches to the rear wall, RW is adjustable and makes difference in choosing the size of the cargo space. Therefore, the size of the cargo space and the whole unit can be adjusted for matching the size of the incoming unit. This option may be used in the beginning of the installation of this unit for a given incoming unit: stroller, so that the area under this wall means to match the size of the incoming unit; stroller or the size of the space to be adjusted later.

C. The lower wall of the box means consists of a rigid base, BA which is strong for holding the whole unit and also being attached to the rear wall, RW and an attachment means, ATM, for being attached to the auto. The base unit has a cushion means located on the floor and is designed to absorb the extra up and down movements. Importantly, it has an upper surface made of a sinusoidal sheet, SS which has its own groves and elevated zones. Importantly, the sinusoidal design of the upper surface of the base unit, BA allows the wheels of incoming unit: stroller to negotiate with the upper points and the groves and engage with the groves and raised walls of this floor for facilitating the movement of the incoming unit inside the box. The use of the sinusoidal design for the floor of these units has the advantage that it will make the construction of these units easier and simpler. Importantly, the floor of the box means may have especially designed cradles as shown in FIG. 7 which has its own proper zones and shapes which will match the position, the size and the shape of the wheels and lower parts of the incoming unit, stroller or wheelchair and similar in order to accept, welcome and embrace them for keeping them inside securely and prevent them from moving in the final position. Many types of attachment means may be used to keep the wheels and the whole unit of the incoming unit securely inside the box means sturdy.

The cushion means have their own sizes, shapes, and makeups, they may have screw means or other means of manipulation in order to allow them to be pushed for being engaged with the unit inside such as strollers, they may have their own detachable and re-attachable attachment means to allow them to be attached to the inside surface of the rear, upper and the front walls and be positioned in an ideal spot for being engaged with the incoming unit.

D. Importantly in this model the front wall when open also allows a free access into the inside of the box means, so that after the placement of the incoming unit; stroller, the incoming unit can be secured inside the box means by various means and then the front wall to be closed.

E. Various means and models of the securing means some mentioned in this application may be used in these units in order to bring the front wall of this unit closer to the rear wall of the box means in order to squeeze the incoming unit in between and prevent it from extra movements and jiggling. These means may be applied and manipulated from inside or outside of these walls. For example they can be like wise means, C clamps, bands, pulling means, screw means and every other kinds of means that the can be used for the purpose of holding the object's inside this box safe.

F. Of importance is the use of various clamps means, band means, screw means, and every other types of securing means with these units, with either being inside or outside of this box means for a quick engagement with incoming unit: stroller for keeping the unit inside this box means securely and preventing it from extra movements. The control or clamp means may be placed and used from the outside or they may use an outside access for being engaged with the inside unit, stroller for securing it in place.

G. It should be noted that using these models there is need for two doors one in the right side which will function as a ramp door and will be modified to be used with the unit shown in FIGS. 23, 24, 28 and similar. These doors can be adjustable, and such adjustable doors are shown in FIGS. 6, 25, 26, 27 and 28.

It should be noted that that the door opposite to the ramp door may also have some or all of the options of the ramp door. The all can be modified to fit the sides of this box means and make a complete adjustable unit for use.

Importantly, all or some of the features explained in the previous application may/will be used and combined with the new versions of these units for making the best possible unit and fit the purpose of a special use. Importantly, note that the side door=the ramp of this box means and the door in the opposite side of the ramp door will be modified and engineered to close the sides of this box means properly and they will have proper means made from rubber or similar to fill the space between these walls and the edges of the flexible body of this box means in order to prevent from passage of the dust and water inside the flexible box means. Also proper locking means will be used to close the doors and walls to the body of this flexible box means.

FIG. 29 A. Shows schematically, the side view a carrier means similar to the model shown in FIG. 29 except the main body of this unit consists of.

A. The rear wall of this unit shown at RW, also is made from
    a flexible, sinusoidal, sheet which complements the body of the flexible front wall, FW and these two walls have an overlapping zone which allows the size of this overlapping zone to be modified. It can be enlarged to reduce the size of the underlying cargo space or it can be reduced in order to make the cargo space larger. These will be fixed to get it by use of different attachment means such as screws which is not shown in this figure. Note the front wall made of a sinusoidal, flexible sheet and can flex and bend so that the lower end of the front wall, FW can be pulled down and attached to the lock means, LB as it was explained in previous figures this unit also has other pieces and parts which were shown in FIG. 29 as desired.

B. Note in this model the attachment means ATM is also moved to attach to the base of the box means, similar to some other models shown in this application. This design also allows the overall length of the upper wall, UW and the front wall, FW and the rear wall, RW to be modifiable, longer or shorter in order to allow the cargo space to be modified. Importantly also note in some models most of or the whole part of the rear wall RW of the box means may be also made from sturdy, strait steel, to attach to the flexible sinusoidal sheet of material at some point of its surface. Also importantly please note that the flexible walls of this box means do not need to be sinusoidal a shown in FIG. 23-24, and may be made from a flexible steel sheet, or a flexible aluminum sheet or sheets of different metals or manmade materials. Even the of fabrics, canvas, screens, and PVC materials and other materials may be used as desired and was appropriate for the use as explained earlier. Again in the case of materials such as fabrics and canvas they may be enforced with incorporation of metal screens to prevent them from being cut, or they may be modified in different manners as the need comes.

FIG. 30. Shows schematically the cross cut view of a box means which is also designed to allow their size of the box means to be adjusted. In model the box means consists from a lower part, consisting of with front and rear walls. The front wall is shown at LP and the rear wall is shown at RW. These walls are attached to the base of this unit which is similar to the base of previous models one shown in FIG. 24. This unit has a top part, Top consisting of front, back walls and a roof, R with its side walls. Importantly, the top part of this whole unit has a design which matches the lower part and allows the upper part to be positioned either in a lower position for making a unit with smaller cargo space shown at CA. or be placed in higher position to expand the cargo space allowing a larger incoming unit such as a larger stroller or a wheelchair to fit. Importantly note, the shape of the upper part and ceiling permits the upper portion of the cargo area to be gradually smaller so that the side walls of the upper part to come close to the upper part of the cargo: stroller and almost touch them or their pads. Such proximity by itself will prevent from the incoming units: stroller to be loose and move from front to back with the motion of the car. Also importantly, it will allow this unit to be used with various incoming units: stroller with smaller or larger height when closed. This model will also have other accessories such as pad means and other control means and similar which are shown in previous models and will not be repeated to prevent wasting time. Also the attachment means to the auto is shown at ATM, screw means, SC or other means will allow these parts to be kept secure after being their relative position adjusted.

The Security and Comfort Means.

These units will use an alarm means for detection of an attempt for the removal of the units. This will be a battery operated alarm means that will utilize the available techniques and any new method possible in order to inform the others if someone tries to remove the unit in any form. This method may be attached to the alarm system of the cars.

Also the lock means of this unit may be attached to the locking system of the vehicle so that it can be opened from inside when desired by a remote control means. The wiring of these systems will be attached to the vehicle and controlled.

Importantly, the shape, size, materials, the relative sizes and methods used for some specific functions of these units and other characteristics of these units may vary and be different in order to allow the main purpose of these units to be achieved.

Please note that in order to make the figures less confusing many options which can be used in a single figure are shown in different figures, however, the intention of the applicant is that they be used in a single or couple units for making the most desirable unit. Also importantly, the size, shape, the relative sizes, the materials and every other important issues and means of these inventions may be modified. Also importantly, the new automobiles may be modified to allow these important units which are designed to help the two most important groups of the society the young and the elderlies to be attached to the body easily with use of a detachable and re-attachable means connected to the rear region trunk or the body or combined.

The invention claimed is:

1. An enclosure for carrying a wheeled object for transport by a motor vehicle, the enclosure comprising:
   a base on which a wheeled object can be supported;
   a structure cooperating with the base to form an enclosure for enclosing a wheeled object supported on the base;
   a door which closes an opening in the structure and which can be swung down to form a ramp on which a wheeled object can be rolled onto and off of the base, the ramp having at least one pass for guiding a wheel of a wheeled object during rolling of a wheeled object onto and off of the base;
   and an attachment for separably attaching the enclosure to a motor vehicle;
   in which the base has a cradle into which a wheel of the wheeled object can be received to locate the wheeled object on the base, and the at least one pass comprises laterally spaced apart side walls which can be adjusted laterally on the ramp to set width of the at least one pass.

2. An enclosure as set forth in claim 1 in which the at least one pass comprises two passes each having laterally spaced apart side walls which can be adjusted laterally on the ramp to set their widths and also the lateral distance between the two passes.

3. An enclosure as set forth in claim 1 in which the at least one pass comprises an end opposite the base which is laterally wider than an end at the base.

4. An enclosure as set forth in claim 1 in which the structure comprises at least one part which can be engaged with a wheeled object supported on the base for preventing movement of the wheeled object on the base.

5. An enclosure as set forth in claim 4 in which the at least one part comprises a pad.

6. An enclosure as set forth in claim 4 in which the structure comprises a wall whose shape can be adjusted.

7. An enclosure as set forth in claim 6 in which the wall's shape is adjustable by flexing.

8. An enclosure as set forth in claim 6 in which the wall comprises a front section extending upright from the base, a rear section extending upright from the base, and a curved top section which joins the front and rear sections and is spaced above the base, and the opening which the door closes is located at one end of the front, rear, and top sections.

9. An enclosure as set forth in claim 8 in which at least one of the sections is a corrugated wall.

10. An enclosure as set forth in claim 8 in which the door comprises multiple door sections which are adjustable to conform the door shape to the shape of the opening which the door closes.

11. An enclosure as set forth in claim 8 in which one of the front and rear sections is connectable to the base at a selected one of multiple locations spaced apart in the upright direction.

12. An enclosure as set forth in claim 11 including at least one pad on at least one of the sections for engaging a wheeled object supported on the base to prevent movement of the wheeled object on the base.

13. An enclosure as set forth in claim 12 in which the at least one pad on at least one of the sections comprises at least a pad on the front section, and at least a pad of the rear section for engaging a wheeled object supported on the base to prevent movement of the wheeled object on the base toward and away from the front and rear sections.

14. An enclosure as set forth in claim 8 in which an additional opening is located at an end of the front, rear, and top sections opposite the one end of the front, rear, and top sections, and an additional door closes the additional opening and can be swung down to form a ramp.

15. An enclosure as set forth in claim 1 in which at least one of the structure and the base comprises a corrugated (sinusoidal) wall.

16. An enclosure an set forth in claim 1 including a hinge for enabling the enclosure to swing in at least one of a horizontal direction and a vertical direction relative to the attachment for separably attaching the enclosure to a motor vehicle.

17. An enclosure as set forth in claim 1 including a spring mechanism for keeping the door closed when closing the opening and for keeping the door swung down when forming a ramp.

18. An enclosure as set forth in claim 17 including a handle removably attached both to the door and to the enclosure at the opening which the door opens and closes.

* * * * *